United States Patent
Song et al.

(10) Patent No.: US 10,076,728 B2
(45) Date of Patent: Sep. 18, 2018

(54) CROSSLINKED POLYMER, METHOD FOR PRODUCING THE SAME, MOLECULAR SIEVE COMPOSITION AND MATERIAL SEPARATION MEMBRANES

(71) Applicant: KYOTO UNIVERSITY, Kyoto-shi, Kyoto (JP)

(72) Inventors: Qilei Song, Cambridge (GB); Easan Sivaniah, Kyoto (JP)

(73) Assignee: KYOTO UNIVERSITY, Kyoto (JP)

(*) Notice: Subject to any disclaimer, the term of this patent is extended or adjusted under 35 U.S.C. 154(b) by 9 days.

(21) Appl. No.: 15/121,637

(22) PCT Filed: Feb. 27, 2015

(86) PCT No.: PCT/JP2015/056582
§ 371 (c)(1),
(2) Date: Aug. 25, 2016

(87) PCT Pub. No.: WO2015/129925
PCT Pub. Date: Sep. 3, 2015

(65) Prior Publication Data
US 2016/0367948 A1    Dec. 22, 2016

(30) Foreign Application Priority Data
Feb. 27, 2014   (JP) .................... 2014-037509

(51) Int. Cl.
*B01D 53/22*  (2006.01)
*B01D 71/72*  (2006.01)
(Continued)

(52) U.S. Cl.
CPC .......... *B01D 71/72* (2013.01); *B01D 53/228* (2013.01); *B01D 67/0006* (2013.01);
(Continued)

(58) Field of Classification Search
CPC .. B01D 53/22; B01D 53/228; B01D 67/0006; B01D 67/0093; B01D 69/125;
(Continued)

(56) References Cited

U.S. PATENT DOCUMENTS 7,758,751 B1*  7/2010  Liu ...................... B01D 53/228
                                                    210/321.6
2007/0209505 A1*  9/2007  Liu ...................... B01D 53/228
                                                    95/45
(Continued)

FOREIGN PATENT DOCUMENTS

EP         2397218 A1    12/2011
WO   WO 2003/000774 A1    1/2003
(Continued)

OTHER PUBLICATIONS

Li, Fu Yun et al., "High-Performance Thermally Self-Cross-Linked Polymer of Intrinsic Microporosity (PIM-1) Membranes for Energy Development", Macromolecules, 2012, 45, pp. 1427-1437. (Year: 2012).*

(Continued)

*Primary Examiner* — Jason M Greene
(74) *Attorney, Agent, or Firm* — Leydig, Voit & Mayer, Ltd.

(57) ABSTRACT

The present invention provides a process for thermal crosslinking of polymers of intrinsic microporosity (PIMs) by heat treatment of PIMs under controlled oxygen concentration.

11 Claims, 17 Drawing Sheets

(51) Int. Cl.
  *B01D 67/00* (2006.01)
  *B01D 69/12* (2006.01)
  *B01D 69/14* (2006.01)
  *C08J 3/24* (2006.01)
  *C08J 9/36* (2006.01)

(52) U.S. Cl.
  CPC ....... *B01D 67/0093* (2013.01); *B01D 69/125* (2013.01); *B01D 69/148* (2013.01); *C08J 3/24* (2013.01); *C08J 9/36* (2013.01); *B01D 2256/12* (2013.01); *B01D 2256/24* (2013.01); *B01D 2256/245* (2013.01); *B01D 2257/102* (2013.01); *B01D 2257/504* (2013.01); *B01D 2257/7022* (2013.01); *B01D 2258/0283* (2013.01); *B01D 2323/21* (2013.01); *B01D 2323/30* (2013.01); *C08J 2205/044* (2013.01); *C08J 2379/08* (2013.01); *Y02C 10/10* (2013.01); *Y02P 20/152* (2015.11)

(58) Field of Classification Search
  CPC .. B01D 69/148; B01D 71/72; B01D 2323/21; B01D 2323/30; C08J 3/24; C08J 9/36
  See application file for complete search history.

(56) References Cited

U.S. PATENT DOCUMENTS

| | | | |
|---|---|---|---|
| 2009/0131242 A1* | 5/2009 | Liu | B01D 53/228 502/4 |
| 2013/0247756 A1 | 9/2013 | Li et al. | |
| 2015/0018576 A1 | 1/2015 | Baumgarten et al. | |

FOREIGN PATENT DOCUMENTS

| | | |
|---|---|---|
| WO | WO 2005/012397 A2 | 2/2005 |
| WO | WO 2005/113121 A1 | 12/2005 |
| WO | WO 2006/047423 A2 | 5/2006 |
| WO | WO 2007/084169 A2 | 7/2007 |
| WO | WO 2007/106677 A2 | 9/2007 |
| WO | WO 2009/113747 A1 | 9/2009 |
| WO | WO 2010/048694 A1 | 5/2010 |
| WO | WO 2010/124359 A1 | 11/2010 |
| WO | WO 2011/053403 A1 | 5/2011 |
| WO | WO 2011/057384 A1 | 5/2011 |
| WO | WO 2012/166153 A1 | 12/2012 |
| WO | WO 2012/167114 A2 | 12/2012 |
| WO | WO 2013/057492 A1 | 4/2013 |
| WO | WO 2013/124176 A1 | 8/2013 |

OTHER PUBLICATIONS

Song, Q. et al., "Nanocomposite membrane of a polymer of intrinsic microporosity and zeolitic imidazolate frameworks for gas separation", Procedia Engineering, 2012, 44, pp. 33-36. (Year: 2012).*
Song et al., "Nanocomposite membrane of a polymer of intrinsic microporosity and zeolitic imidazolate frameworks for gas separation," *Procedia Engineering*, 44: 33-36 (2012).
European Patent Office, Extended European Search Report in European Patent Application No. 15754504.7 (dated Oct. 13, 2017).
Bae et al., *Angew. Chem. Int. Ed.*, 49: 9863-9866 (2010).
Budd et al., *Adv. Mater.*, 16(5): 456-459 (2004).
Budd et al., *Journal of Membrane Science*, 251: 263-269 (2005).
Bushell et al., *Angew. Chem. Int. Ed.*, 52(4): 1253-1256 (2013).
Carta et al., *Science*, 339(6117): 303-307 (2013).
Côté et al., *Science*, 310(5751): 1166-1170 (2005).
Du et al., *Macromolecules*, 45: 5134-5139 (2012).
Du et al., *Macromol. Rapid Commun.*, 32(8): 631-636 (2011).
Du et al., *Nat. Mater.*, 10(5): 372-375 (2011).
El-Kaderi et al., *Science*, 316(5822): 268-272 (2007).
Freeman, *Macromolecules*, 32(2): 375-380 (1999).
Furukawa et al., *Science*, 329(5990): 424-428 (2010).
Ghanem et al., *Macromolecules*, 42(20): 7881-7888 (2009).
Hayashi et al., *Nat. Mater.*, 6(7): 501-506 (2007).
Jones et al., *Nature*, 474(7351): 367-371 (2011).
Kiyono et al., *Carbon*, 48: 4442-4449 (2010).
Kiyono et al., *Journal of Membrane Science*, 359: 2-10 (2010).
Kratochvil et al., *Macromolecules*, 41(21): 7920-7927 (2008).
Lai et al., *Science*, 300(5618): 456-460 (2003).
Li et al., *Macromolecules*, 45: 1427-1437 (2012).
Lin et al., *Science*, 311(5761): 639-642 (2006).
Ma et al., *Carbon*, 62: 88-96 (2013).
Mason et al., *Macromolecules*, 44: 6471-6479 (2011).
McKeown et al., *Chem. Eur. J.*, 11(9): 2610-2620 (2005).
McKeown et al., *Chem. Soc. Rev.*, 35(8): 675-683 (2006).
Merkel et al., *Science*, 296(5567): 519-522 (2002).
Nagai et al., *Prog. Polym. Sci.*, 26: 721-798 (2001).
Park et al., *Journal of Membrane Science*, 359: 11-24 (2010).
Park et al., *PNAS*, 103(27): 10186-10191 (2006).
Park et al., *Science*, 318(5848): 254-258 (2007).
Robeson, *Journal of Membrane Science*, 320: 390-400 (2008).
Song et al., *Energy Environ. Sci.*, 5: 8359-8369 (2012).
Song et al., *Nature Communications*, 4(1918): 1-9 (2013).
Swaidan et al., *Journal of Membrane Science*, 447: 387-394 (2013).
Tozawa et al., *Nat. Mater.*, 8(12): 973-978 (2009).
Varoon et al., *Science*, 334(6052): 72-75 (2011).
Yaghi et al., *Nature*, 423(6941): 705-714 (2003).
Japan Patent Office, International Search Report in International Patent Application PCT/JP2015/056582 (dated Jun. 9, 2015), English translation.

* cited by examiner

[Fig.1]
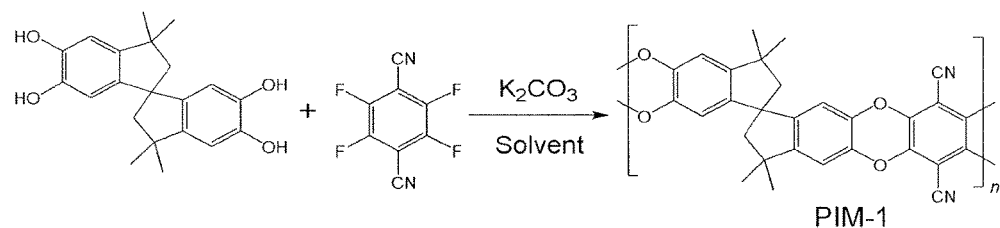
[Fig. 2]
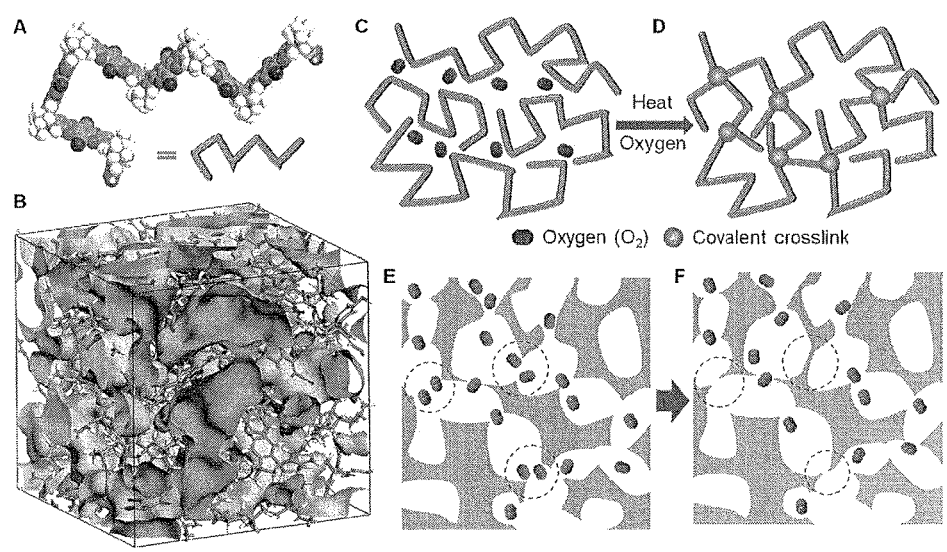

[Fig. 3]
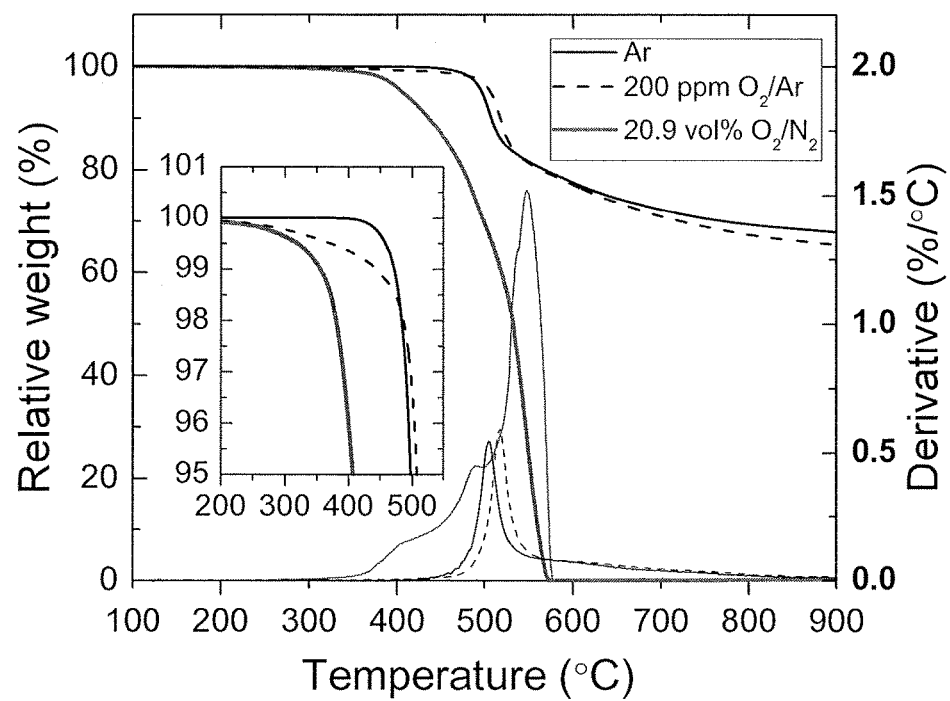

[Fig.4]
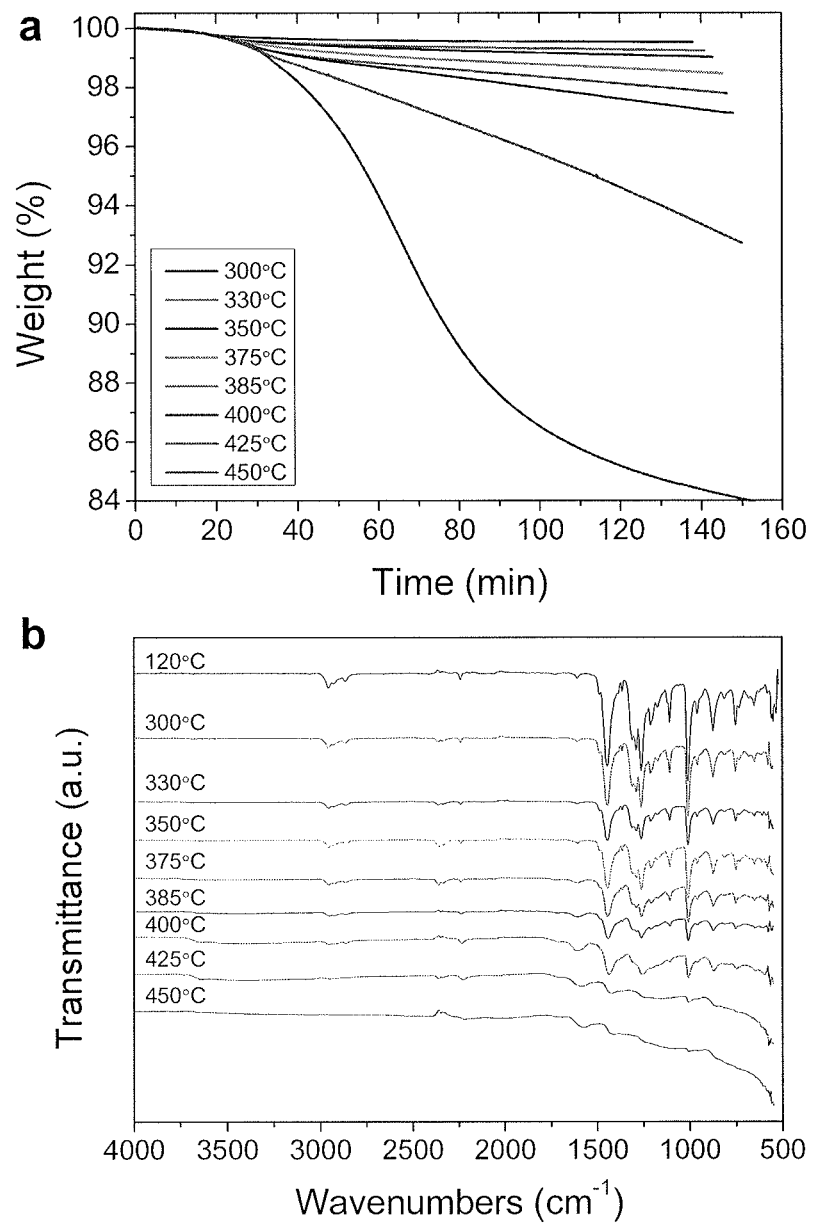

[Fig.5]
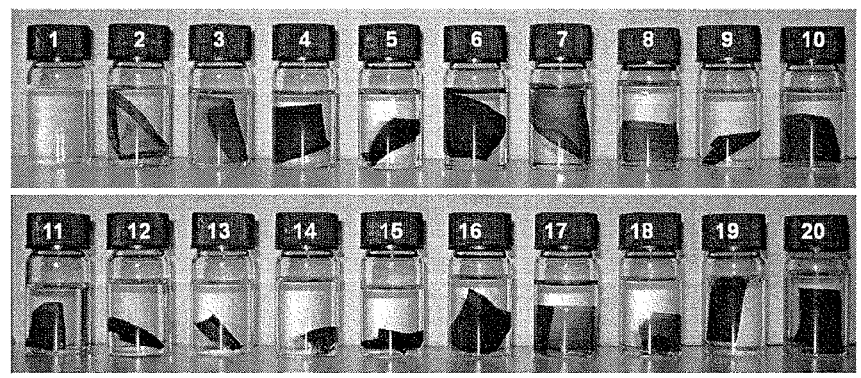
[Fig.6]
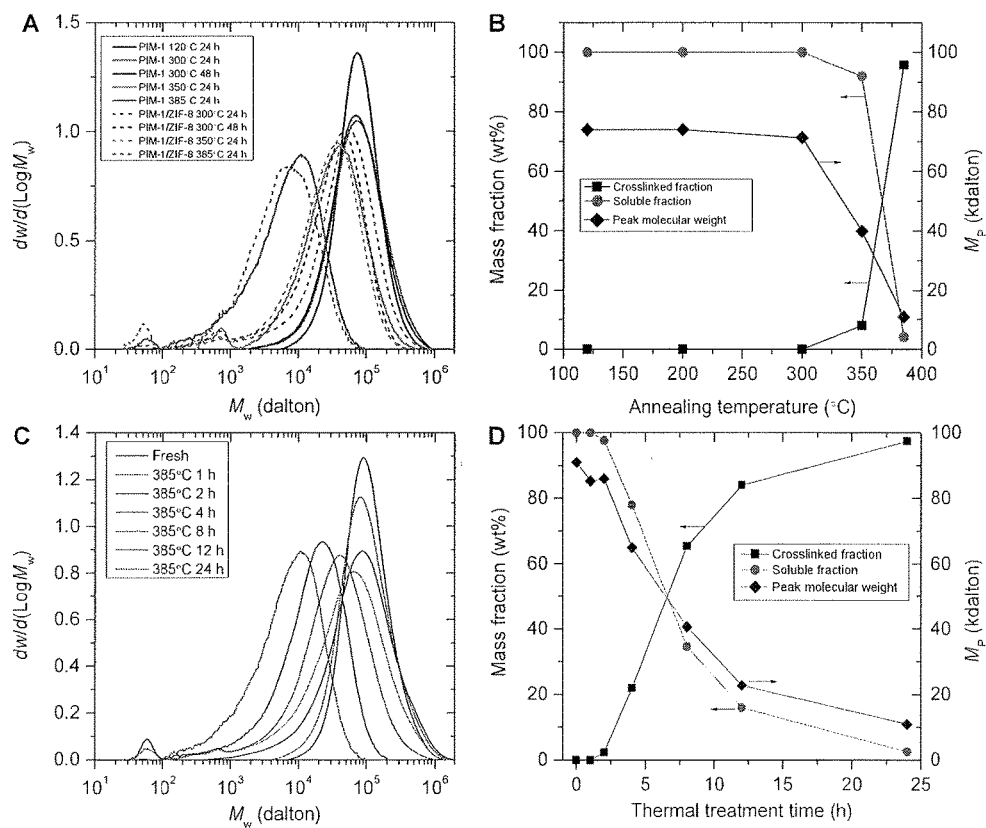

[Fig.7]
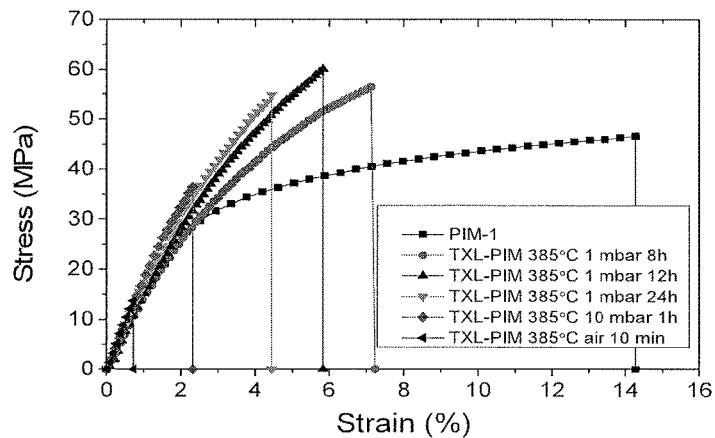
[Fig.8]
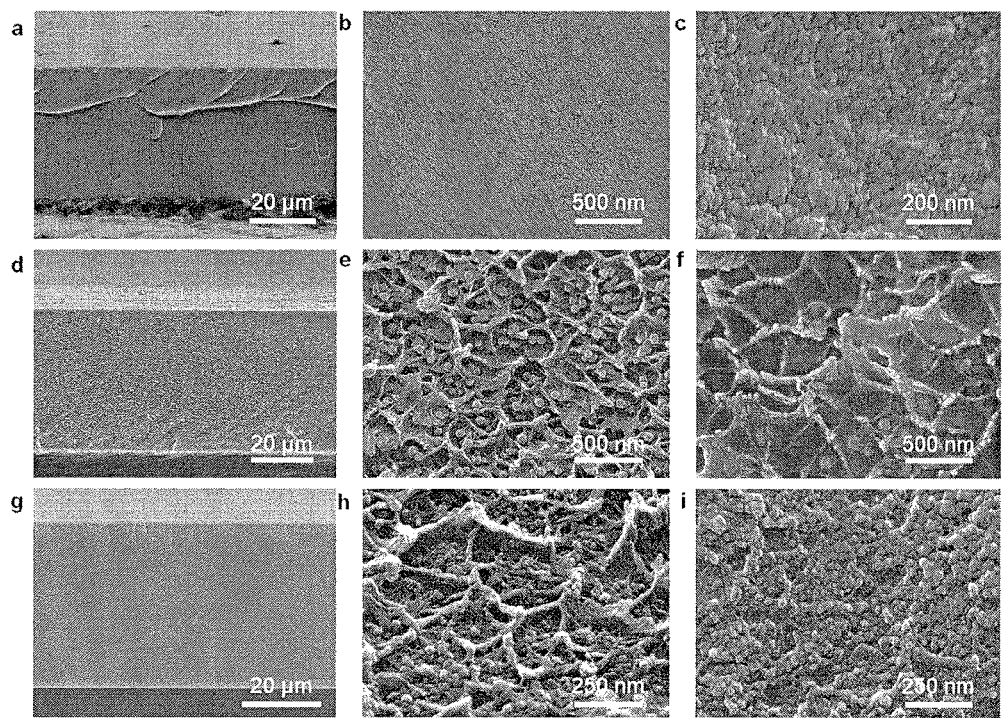

[Fig.9]
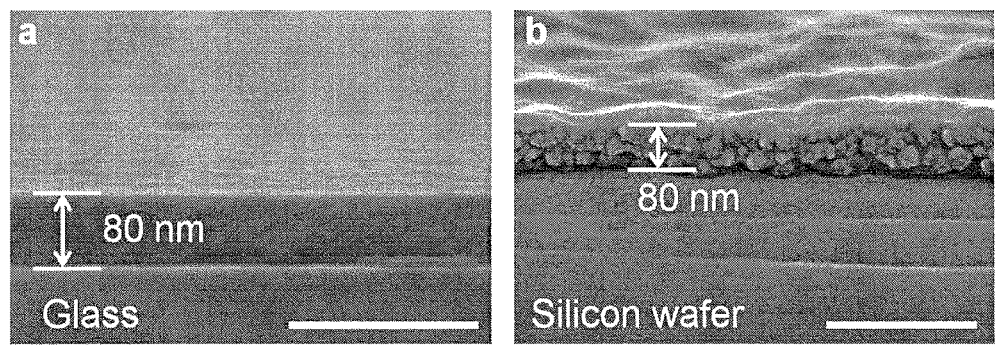
[Fig. 10]
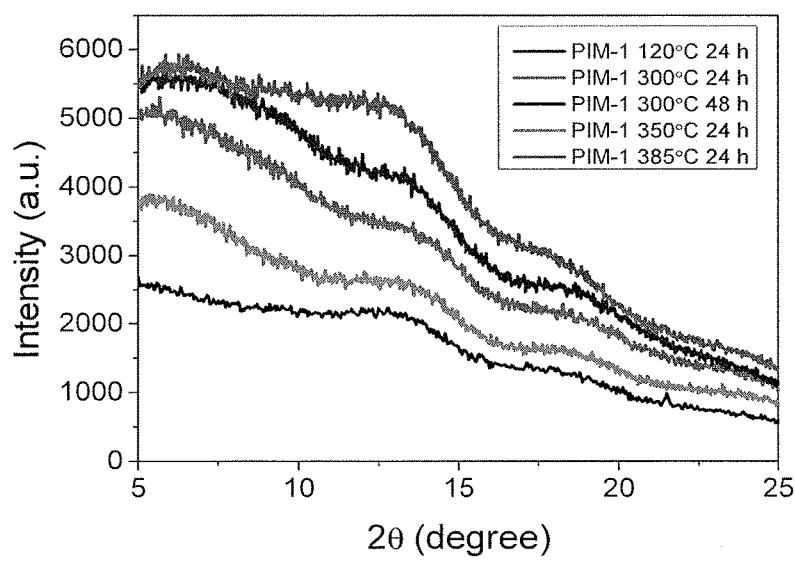

[Fig. 11]
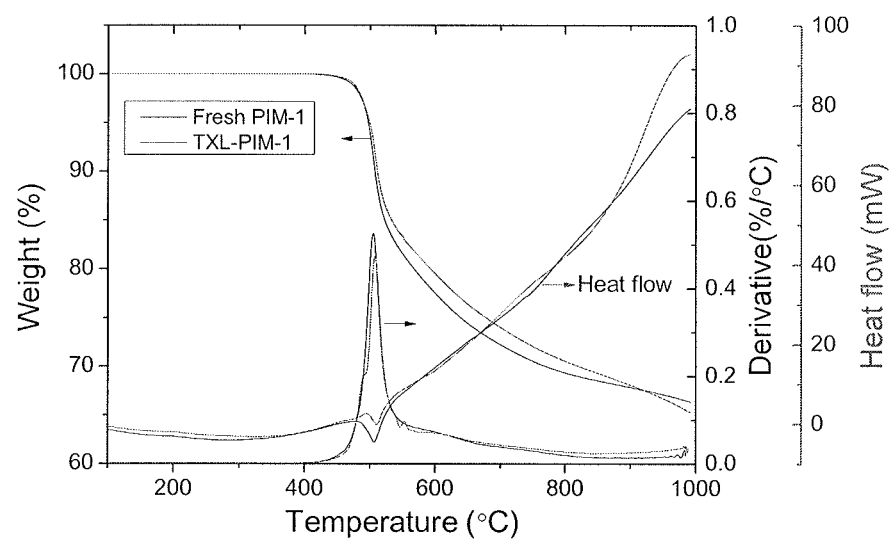

[Fig.12]
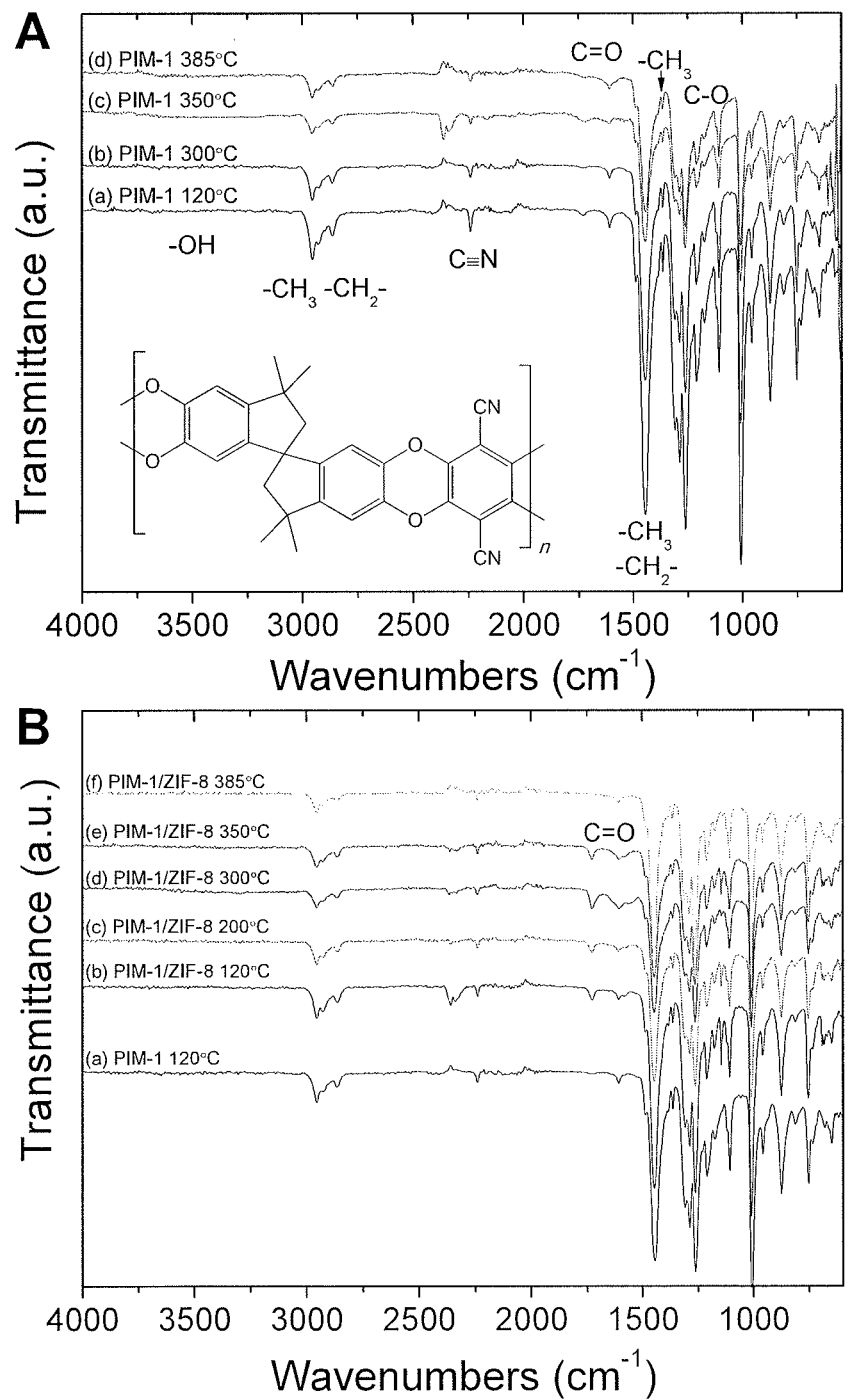

[Fig.13]
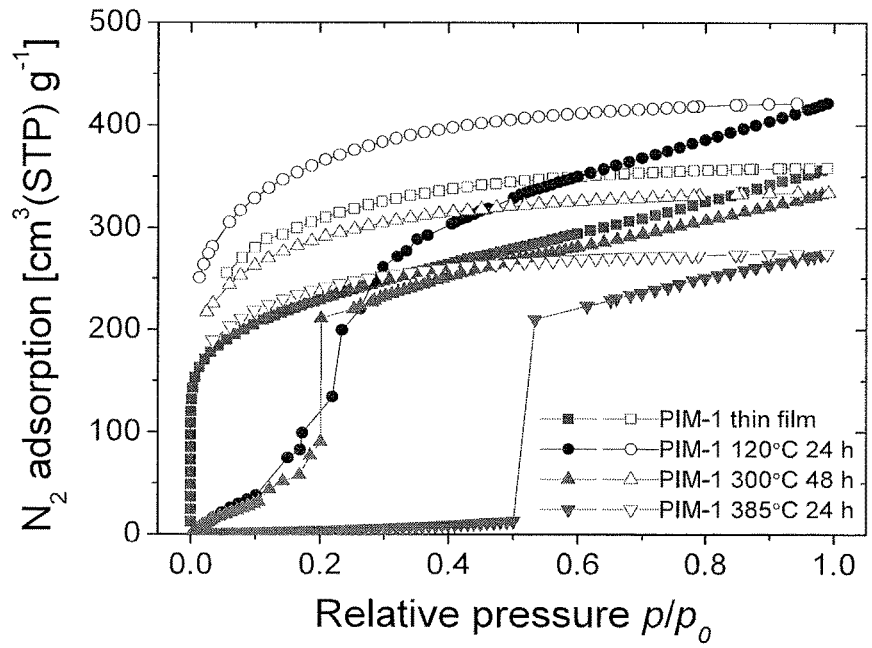
[Fig.14]
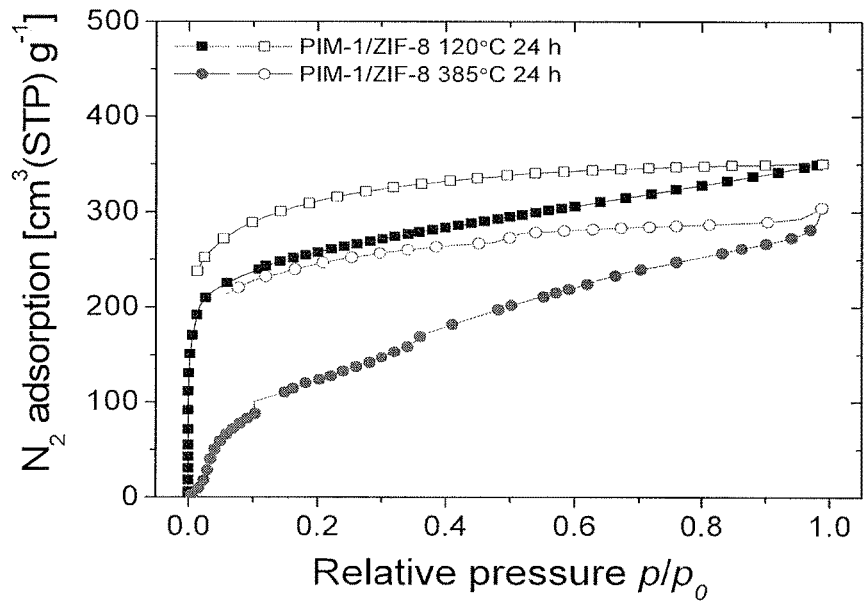

[Fig.15]
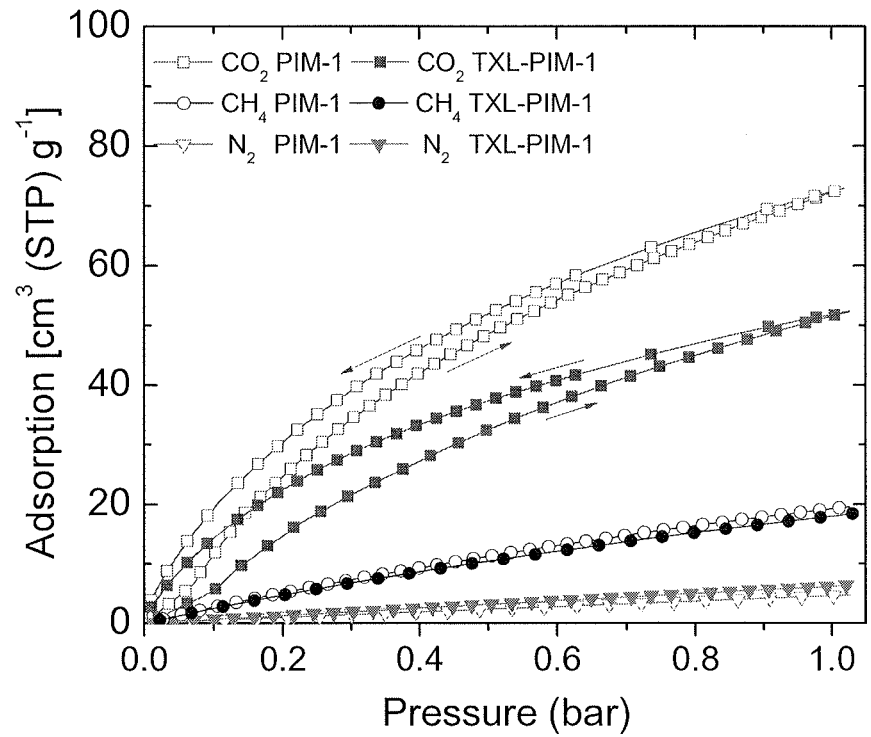
[Fig. 16]
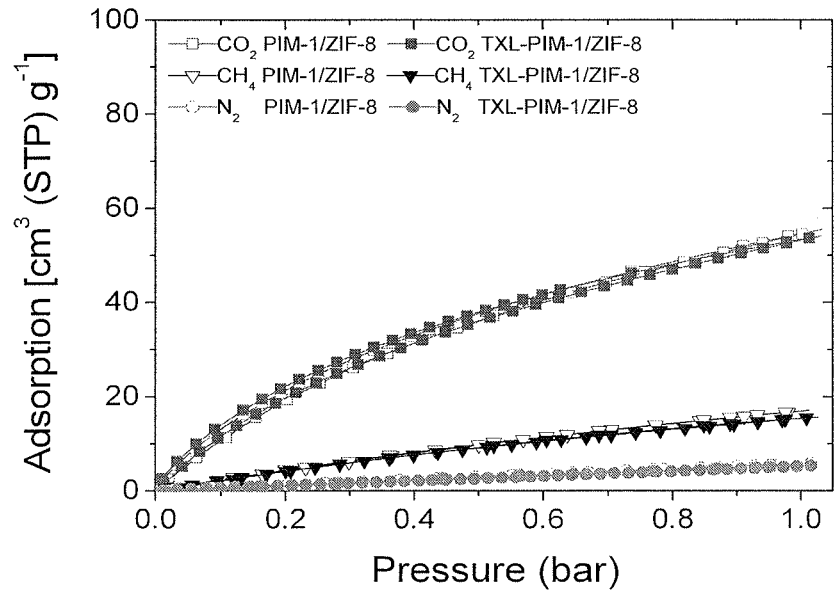

[Fig. 17]
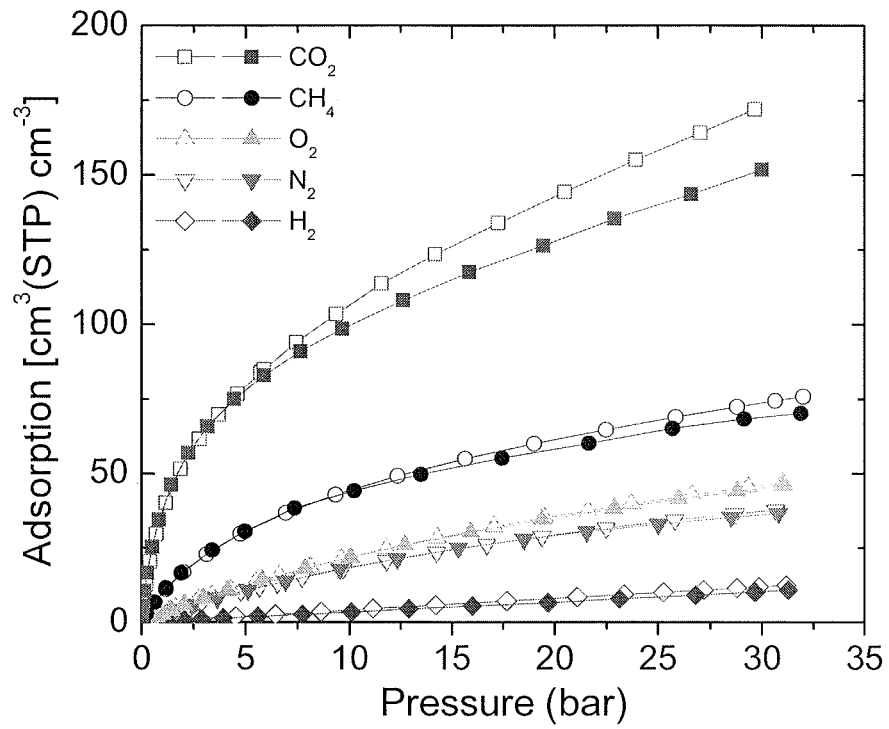
[Fig. 18]
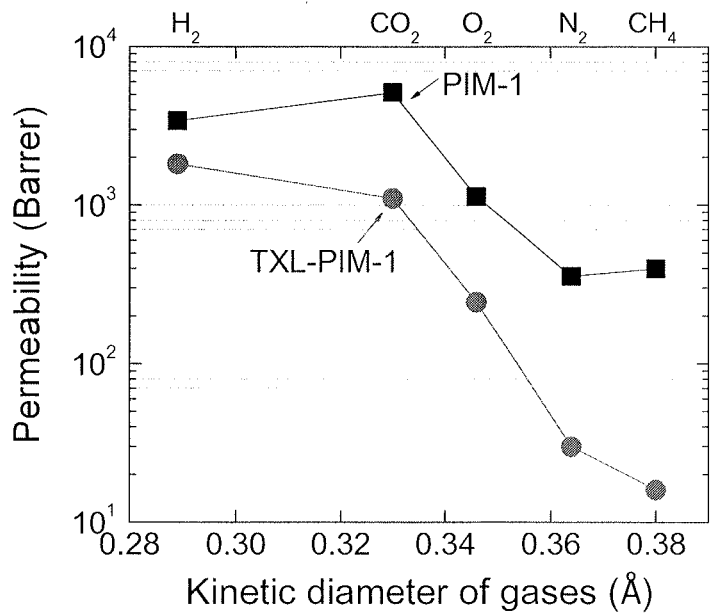

[Fig.19]
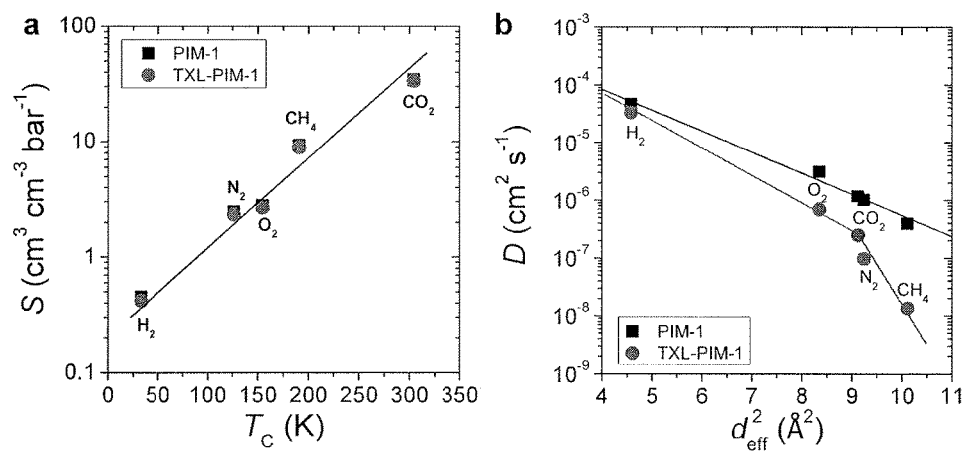
[Fig.20]
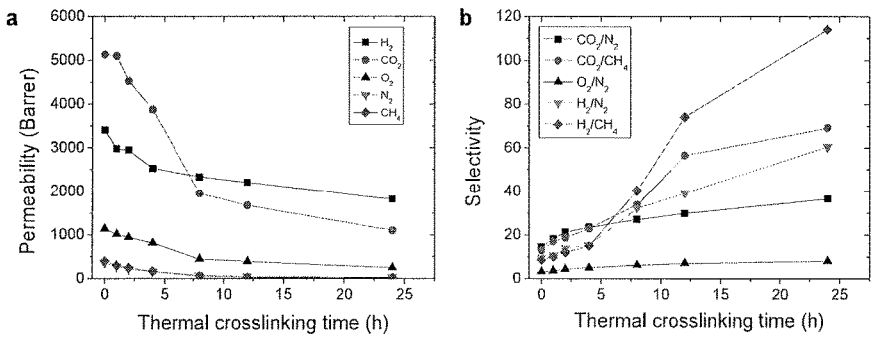

[Fig.21]
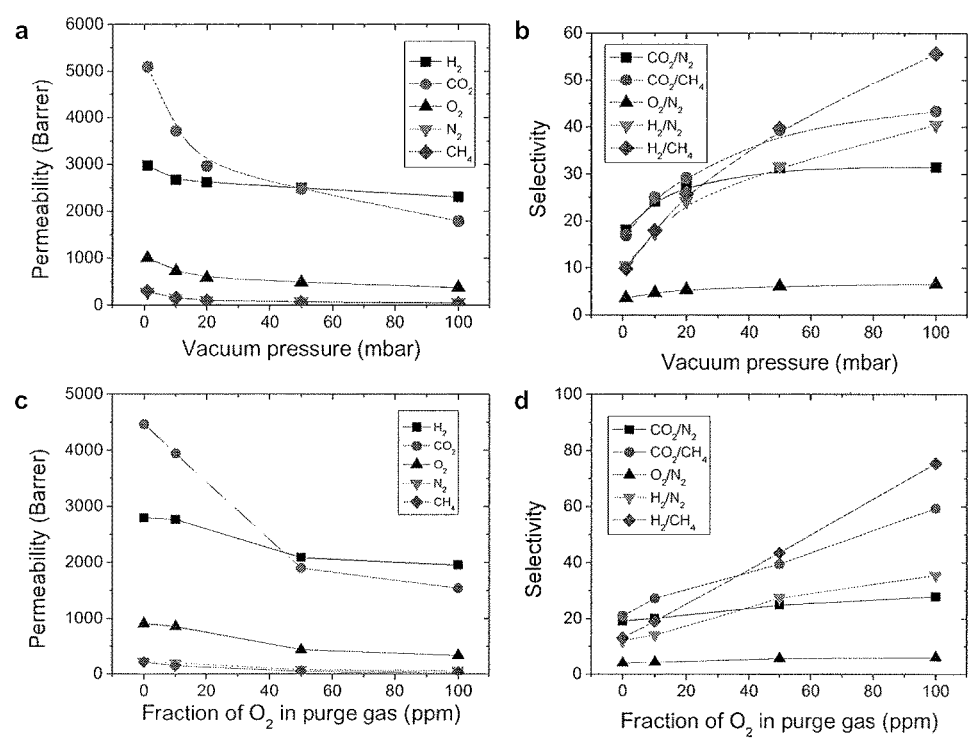

[Fig. 22]
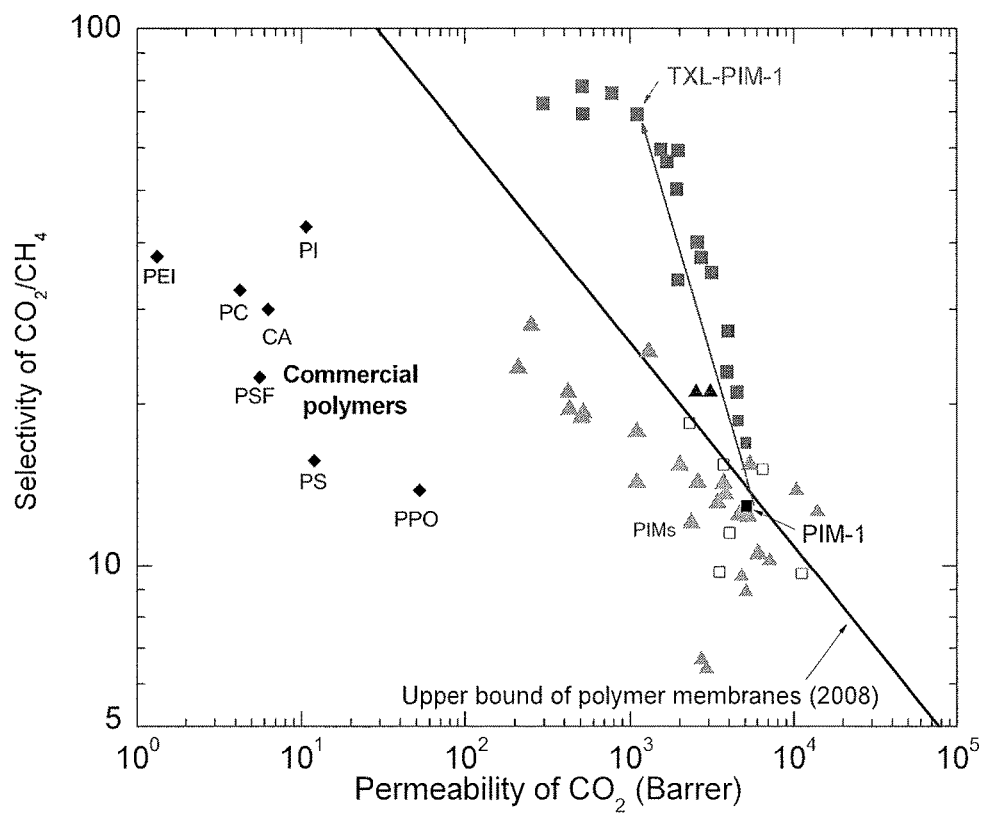

[Fig. 23]
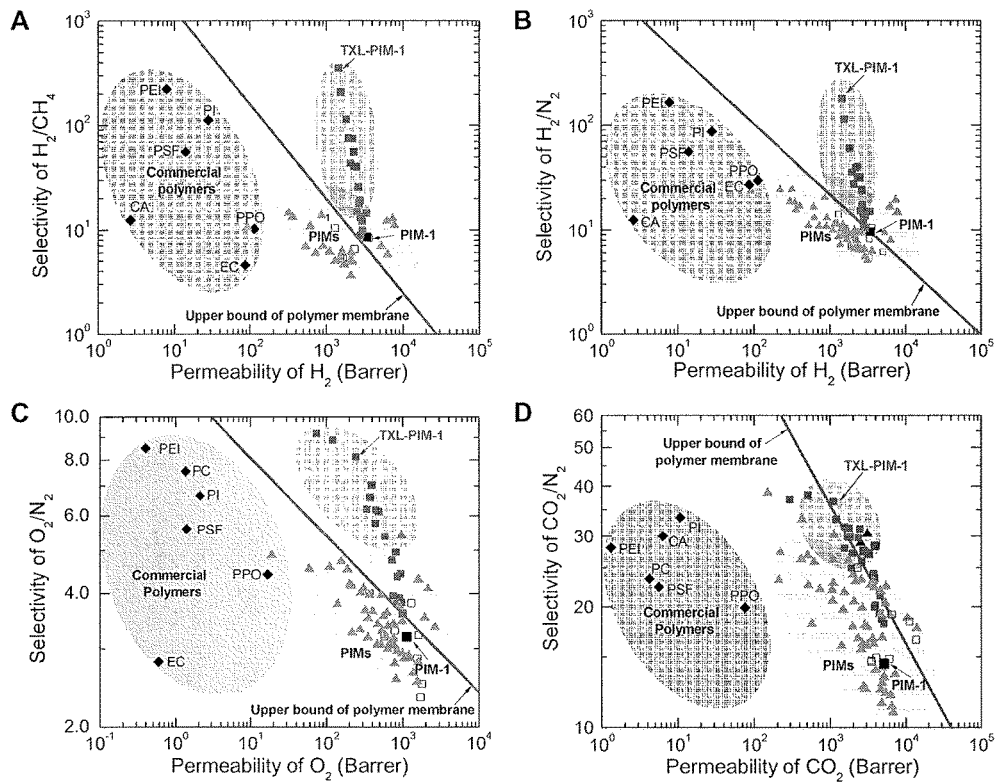

[Fig.24]
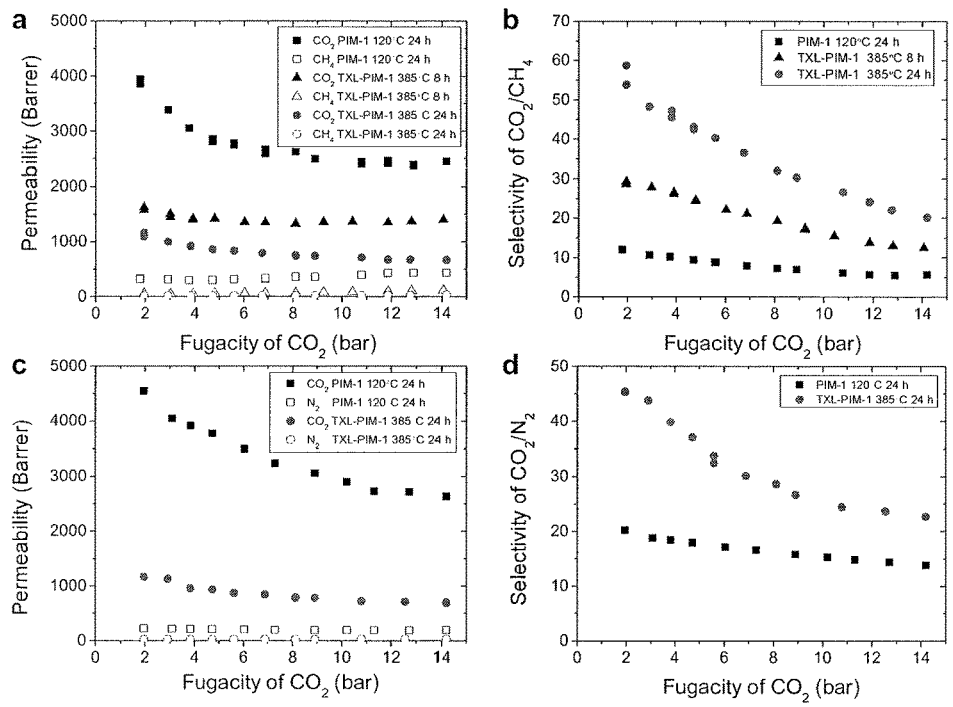
[Fig.25]
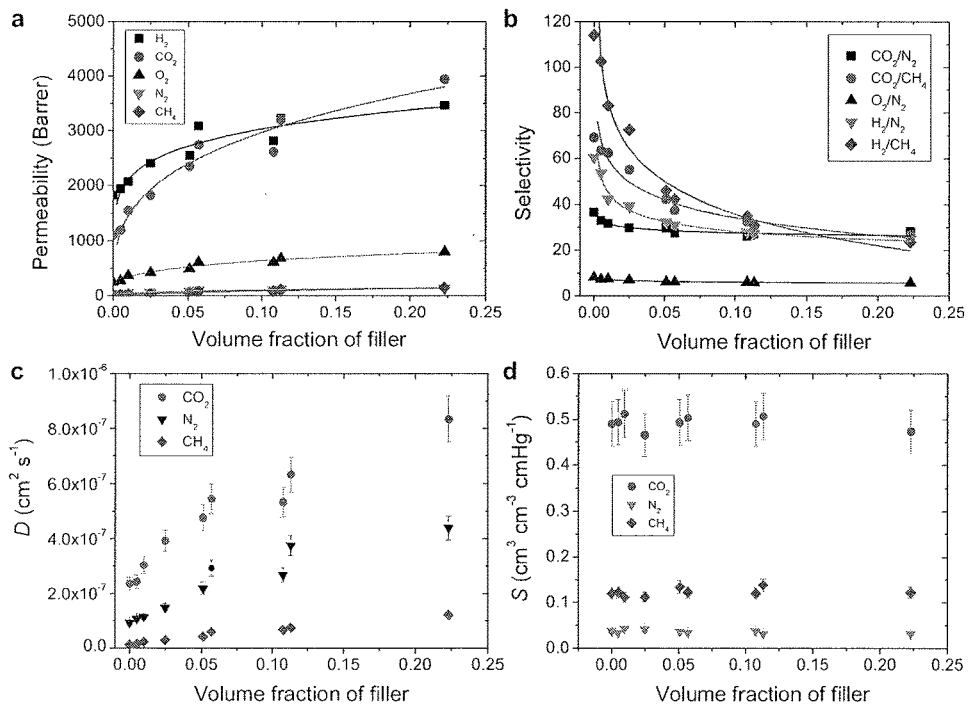

[Fig. 26]
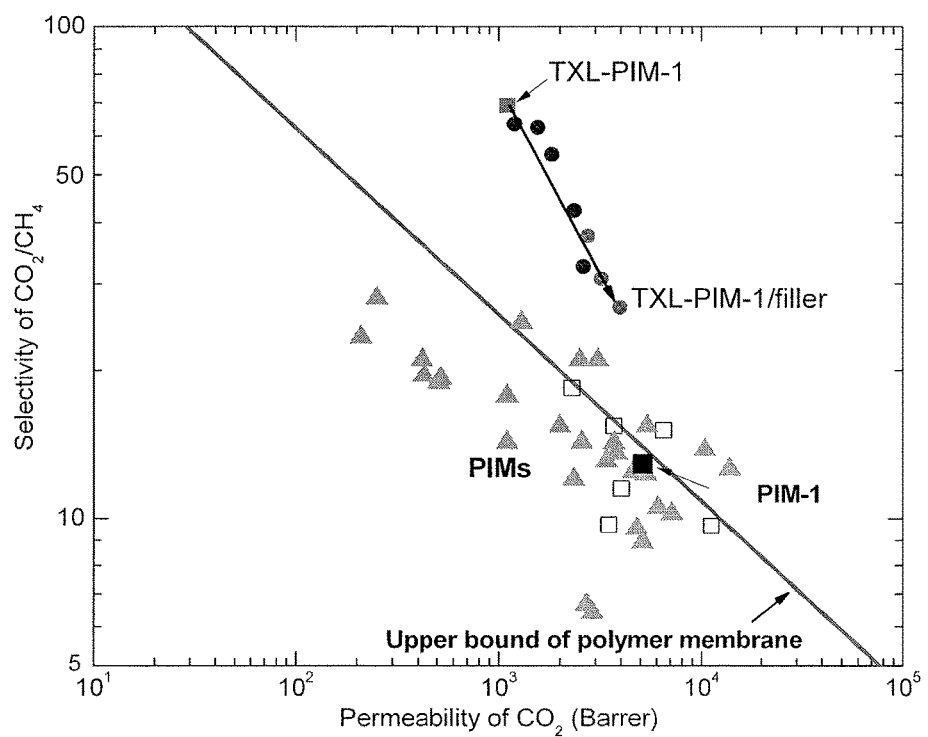

CROSSLINKED POLYMER, METHOD FOR PRODUCING THE SAME, MOLECULAR SIEVE COMPOSITION AND MATERIAL SEPARATION MEMBRANES

CROSS-REFERENCE TO RELATED APPLICATIONS

This patent application is the U.S. national phase of International Patent Application No. PCT/JP2015/056582, filed on Feb. 27, 2015, which claims the benefit of Japanese Patent Application No. 2014-037509, filed Feb. 27, 2014, the disclosures of which are incorporated herein by reference in their entireties for all purposes.

TECHNICAL FIELD

The present invention relates to a crosslinked polymer, a method for producing the same, molecular sieve composition and material separation membranes.

BACKGROUND ART

Microporous materials with pore size in the dimension of less than 2 nm are promising for a wide range of applications, in gas sorption and storage, gas separation, molecular sieves, catalysis, sensoring, and energy storage. The fabrication of microporous materials to membranes is further attractive for molecular separations because membrane separation technology is more energy-efficient compared to conventional molecular separation technologies, such as cryogenic distillation and absorption.

Ordered frameworks, such as zeolite (NPL 1-2, paper on zeolites), and metal-organic frameworks (MOFs) (NPL 3-6, paper on MOFs), are assembled from building blocks into homogeneous crystals with precisely defined porous-framework architecture. However, these crystalline frameworks are generally brittle and suffer from difficulty in manufacturing to large scale separation membranes.

In contrast, industrial, solution processable, selective membranes are made of densely packed polymers where molecules transport follows a solution-diffusion mechanism, and presents a trade-off between permeability and selectivity (NPL 7, Freeman, Upper bound, 1999), known as an upper bound (NPL 8, Robeson's upper bound, 1991, 2008). Conventional polymers pack efficiently with low free volume in the matrix, where the molecules are dissolved in the polymer and diffuse slowly through the free volume. Therefore, the molecular transport through these polymers is very slow, giving considerably low gas permeability that limits the large scale application of membrane separation processes.

According to the theoretical prediction by Freeman, there are two strategies to enhance both the permeability and selectivity of next-generation polymeric membrane materials: (i) improving the solubility selectivity ($S_A/S_B$), such as crosslinked poly(ethylene oxide) based membranes (NPL, 9); (ii) increasing the stiffness of polymer chains while maintaining large interchain spacing, such as thermal rearranged (TR) polymers (NPL10-11) and polymers of intrinsic microporosity (PIMs) (NPL 12-17), which are microporous materials with interconnected free volumes or micropores. The pores and channels are interconnected with size at molecular dimensions (<1 nm), the membrane would become a molecular sieve, allowing smaller gas molecules passing through the channels while blocking larger ones. Polymers with rigid macromolecular structures have high free volume and high permeability, such as poly(1-trimethylsilyl-1-propyne) (PTMSP) [NPL 18, Nagai et al, Poly[1-(trimethylsilyl)-1-propyne] and related polymers: Synthesis, properties and functions, Prog. Polym. Sci. 2001, 26, 721]. However, these highly permeable polymers have very poor selectivity that limits the practical applications of the polymers in molecular separations.

In the past decade, the materials and chemistry field have witnessed an explosive growth of interest in synthesis, design and fabrication of new-generation microporous materials, such as Polymers of intrinsic microporosity (PIMs) [NPL 12-17], covalent organic frameworks (COFs) [NPL 19-20], and porous organic cages (POCs) [NPL 21-23]. These porous organic materials are highly promising for molecular separations, gas storage, catalysis, organic molecular sieves and membrane materials.

Polymers of Intrinsic Microporosity (PIMs) are one class of microporous organic materials [NPL 12-17]. The concept of polymers of intrinsic microporosity was first invented by Budd and McKeown in 2002. The international patent WO2003000774 A1 describes the organic microporous network materials comprising a rigid 3-dimensional network of planar porphyrinic macrocycles in which pyrrole residues of adjacent macrocycles are connected by rigid linkers which restrain these adjacent macrocycles such that their porphyrinic planes are in a non-co-planar orientation. Preferred materials in accordance with the invention are phthalocyanine networks. These organic microporous materials are known as network PIMs.

Another invention by Budd and McKeown, international patent WO2005012397A2 and U.S. Pat. No. 7,690,514 B2, describes microporous organic macromolecules comprised of first generally planar species connected by rigid linkers having a point of contortion such that two adjacent first planar species connected by the linker are held in non-coplanar orientation, subject to the proviso that the first species are other than porphyrinic macrocycles. Preferred points of contortion are spiro groups, bridged ring moieties and sterically congested single covalent bonds around which there is restricted rotation. A typical synthetic approach of a representative PIM-1 polymer is shown in the drawing FIG. 1. Such non-network linear polymer chains are soluble in common organic solvents, so they can processed by solution casting methods to form films, coating on other materials, or manufactured to any shapes.

The backbone of PIMs polymers inhibits the free rotation or large scale conformational change and polymer chains cannot pack efficiently in the amorphous solid state, forming irregularly shaped free volume elements at molecular dimensions, as visualized in FIG. 2. The fractional free volume in PIM is sufficiently high that free volume elements are effectively interconnected, behaving like micropores (dimensions <2 nm). As probed by gas sorption, the PIMs polymers contain relatively high surface areas (400-1000 $m^2/g$). Such high free volume in PIMs form unique hourglass shaped structure behave like interconnected micropores, which allow high sorption capacity and rapid diffusion of molecules, while the 'bottleneck' or channels or gateways occupied by densely packed chain behave as sieves that could selectively screen molecules with different sizes or kinetic diameters.

International patent PCT/US2005/038195 describes the synthesis of covalently linked organic frameworks and polyhedra, known as COFs. The COFs materials are synthesized from organic building blocks linked by covalent bonds forming crystalline architecture with tuneable porosity at molecular dimensions. The organic building blocks could be tuned to tailor the structure, functionality, and materials properties. Though the pore structure of COFs could be well-defined forming ordered crystalline structure, these ordered porous COFs materials are generally not solution processable, limiting their processing and further fabrication into more useful membranes.

A particular promising application of these microporous polymers is fabrication of membrane for molecular separations. International Patent WO 2005/113121 (PCT/GB2005/002028) describes the formation of thin film composite (TFC) membranes by coating PIMs polymer onto a porous support membrane. The membranes were demonstrated as promising for gas separation, pervaporation (phenol/water, ethanol/water), propene and propane separation, and nanofiltration.

Amorphous polymer chains interact by relatively weak noncovalent interactions such as van der Waals forces or entanglements, and easily slide over each other. At the microscopic level, the amorphous nature of PIMs polymer chains results in a broad size distribution of free volume elements (4 to 10 Å) with different topologies existing in all the PIMs polymers, which compromises their separation performance, i.e. poor molecular selectivity, physical aging and plasticization. In particular, for industrially and environmentally important gases, such as separations of $CO_2$/$CH_4$ and hydrocarbons in natural gas industry, all of which have high solubility in glassy polymers. All of the existing PIMs polymers have only shown modest selectivity for $CO_2$/$CH_4$ separations. Therefore, tailoring the distribution, size, and architecture of channels and free volume elements is critical to achieve substantial increase of diffusivity selectivity via molecular sieving function.

International patent WO2010124359A1 disclose a method of preparing carboxylated Polymers of Intrinsic Microporosity (PIMs) by controlling the degree of hydrolysis of with tunable gas transport properties. The essential concept is hydrolyzing all or a portion of the —CN groups to form —COOH groups. International patent WO2010048694 (A1) disclose chemical structure and synthesis strategies for new PIMs polymers and their application for separation membranes. Another patent WO2011057384A1 further provides a tetrazole-containing polymer of intrinsic microporosity. A polymer of intrinsic microporosity (PIM-1) was modified using a "click chemistry" [2+3] cycloaddition reaction with sodium azide and zinc chloride to yield new PIMs containing tetrazole units (TZPIMs), with details report in a paper by Du et al (NPL 16). Recently, other similar works on transformation of nitrile groups in PIMs polymer membranes have been reported. Mason et al [NPL 24] prepared a thionated PIM-1 membrane by reaction of PIM-1 with phosphorous pentasulfide in the presence of sodium sulfite. However, most of these modifications introduce hydrogen bonding, e.g. functional groups with the dioxane linkages, rather than covalent crosslinking. Therefore, the rigidity of the network structure is not stable and the selectivity is not sufficiently high. For example, the performance of solubility-favored TZPIMs remains to be improved for separation of condensable gas molecules ($CO_2$ and $CH_4$), which only shows modest selectivity (~15) for $CO_2$/$CH_4$ gas pair, though the CO2 permeability is as high as 2000-3000 Barrer.

When polymers are used for molecular separations, such as gas separation, organic solvent nanofiltration and ethanol/water separations, the stability of polymer in chemicals and solvents becomes a critical issue. The desirable strategy is covalently crosslinking of the polymer chains to form network structure, so the polymer would become stable in practical applications. Covalent cross-linking of polymer is the process of chemically linking polymer chains by covalent bonds. After covalent crosslinking, the polymer molecules cannot slide over each other so easily and the resulting polymer network becomes tougher and less flexible. Such crosslinked network may become more resistant to plasticization by condensable gas molecules, therefore covalent crosslinking is a favourable approach to stabilize polymeric membranes.

United States patent U.S. Pat. No. 7,758,751 B1 claimed UV-cross-linked membranes from polymers of intrinsic microporosity (PIMs) and the use of such membranes for separations, which were prepared by exposing PIMs membranes to short-wavelength UV irradiation. U.S. Pat. No. 7,758,751 B1 patent claimed the crosslinking of polymer without any scientific proof. Another US patent US 20130247756 A1 claimed UV-rearranged PIM-1 membranes by similar process of UV irradiation and their use for hydrogen separation. In both patents, the UV irradiated membranes apparently show higher selectivity and lower permeability. However, the attribution of the performance to crosslinking (in the U.S. Pat. No. 7,758,751 B1 patent) or chain rearrangement (US 20130247756 A1) is clearly in error. Recent independent research by the inventors of this patent (NPL 25, Song et al, Nature Communications, Photo-oxidative enhancement of polymeric molecular sieve membranes, 2013) demonstrate that observed apparently enhanced selectivity in gas separation arises from the ultraviolet-induced photo-oxidation at the surface of the membranes, which produces a dense selective surface skin to a high-permeability and porous material. The photo-oxidation reactions of PIM-1 polymer induce oxidative chain scission at the surface of membranes rather than covalent crosslinking or rearrangement. Such photodegradation at surface is evidenced by loss in molecular weight and limited transmission of UV light within only several hundreds of nanometers at the surface, and solubility of the surface in polar solvents and organic vapour.

Thermal treatment is a commonly used method for processing of polymeric materials. However, thermal treatment at excessive high temperature could induce chemical reactions or degradation of the polymers depending on the thermal stability of functional groups and atmosphere. Degradation of polymers is defined as the deterioration of the properties, such as hardening, reduced ductility and brittleness, softening, cracking, colour changes, and reduction in other desirable physical properties. Thermal degradation can be divided into three types: depolymerisation, random chain scission, and substituent reactions. The former two types of degradation usually involve the scission of backbone and change of molecular weight (and distribution). On the one hand, significant degree of chemical reactions involved in thermal degradation at high temperature could lead to the deterioration of physical and chemical properties. On the other hand, thermal treatment in controlled atmospheres could also be useful for modifying the physical and chemical properties of polymer to achieve specific purpose, such as the enhanced molecular sieving function as reported in this invention.

Recently, covalently crosslinked PIMs have been prepared by mixing the PIM polymer with crosslinking agent that induce covalent crosslinking reactions upon heat treatment. For example, Du et al reported cross-linked PIMs membranes, prepared by a nitrene reaction from PIM-1 in the presence of two different diazide cross-linkers [NPL 26, N. Du et al., Azide-Based Cross-Linking of Polymers of Intrinsic Microporosity (PIMs) for Condensable Gas Separation. *Macromol. Rapid Commun.* 32, 631-636 (2011)1.

The PIM-1 polymer was mixed with azides and covalently crosslinked by heat treatment at 175° C. for 7.5 h. These covalently cross-linked polymeric membranes showed improved selectivity in gas separation and higher resistance to $CO_2$ plasticization. However, these crosslinking methods also result in significant loss in permeability, for example, the azide-crosslinked membranes show $CO_2$ permeability of about 200-600 Barrer with the selectivity of $CO_2/N_2$ increase to 27.

Thermal crosslinking at intermediate temperature (<450° C.) are also used in crosslinking polymers. For example, Koros and co-workers [NPL 27, Kratochvil, A. M. & Koros, W. J., Decarboxylation-Induced Cross-Linking of a Polyimide for Enhanced CO2 Plasticization Resistance. Macromolecules 41, 7920-7927 (2008)] found the crosslinking of carboxylic acid-containing 6FDA-based polyimides annealed at temperature close to 375° C. The authors performed various characterization techniques and ruled out the possible mechanisms including charge transfer complexing, oligomer cross-linking, decomposition, and dianhydride formation. The decarboxylation reaction removes the pendant acid group creating a phenyl radical capable of attacking other portions of the polyimide forming covalent aliphatic and aryl crosslinking bonds. Similarly, Du et al [NPL 28, Du et al, Decarboxylation-Induced Cross-Linking of Polymers of Intrinsic Microporosity (Pims) for Membrane Gas Separation. *Macromolecules* 45, 5134-5139 (2012)] reported the decarboxylation-induced crosslinked PIM membranes by heat treatment of carboxylated PIMs membrane at relatively higher temperature (375° C.). The resulting crosslinked membranes show improved selectivity for several gas pairs, such as $CO_2/CH_4$ of 25 and $CO_2/N_2$ selectivity of 26 while the $CO_2$ permeability maintained at reasonable high level at 1291 Barrer.

Recently, thermal treatment of PIM-1 membranes was reported by Li et al [NPL 29, F. Y. Li, Y. Xiao, T.-S. Chung, S. Kawi, High-Performance Thermally Self-Cross-Linked Polymer of Intrinsic Microporosity (PIM-1) Membranes for Energy Development. Macromolecules 45, 1427-1437 (2012)]. Li et al claimed the transformation of the nitrile groups of PIM-1 to triazine rings at an elevated temperature at 300° C. with a prolonged soaking time of 2 days under vacuum. Li et al reported both increase of gas permeability and selectivity with thermal treatment. The resulting cross-linked PIM-1 membrane thermally treated at 300° C. for 2 days had a $CO_2$ permeability of 4000 barrer and a $CO_2/CH_4$ and $CO_2/N_2$ ideal selectivity of 54.8 and 41.7, respectively, which were far beyond the Robeson's upper bounds. While Li et al observed covalent crosslinking of PIM-1 polymers, however their proposed mechanism is questionable, and their uncontrolled operation conditions of thermal treatment, as well as results, are not reproducible and making it not possible to apply the method to control the properties of polymers.

Thermal treatment was also used to transform a class of polymers to microporous materials, known as thermally rearranged (TR) polymers. TR polymers are aromatic polymers prepared by thermal treatment of polyimides with ortho-functional groups (PIOFG) [NPL 10-11, Park et al, Science, 2007]. International patent WO2009113747 A1 and WO2012167114A2 disclose the details of the synthesis of thermally treated polymers and applications for gas separation membranes. International patent WO2012166153A1 further disclose the applications of thermally rearranged (TR) polymers as membranes for ethanol dehydration. In TR polymers, ortho-functional group can be hydroxyl (—OH), thiol (—SH), and amine (—$NH_2$) groups. The thermal treatments are usually performed at intermediate temperatures (350-450° C.) in inert atmosphere, after which the polymers are transformed to aromatic, infusible, and insoluble materials. Advanced characterization analyses of TR polymers indicate that the free volume or micropore and their size distributions could be tuned by varying the monomer structures of the precursor polymers and by using different thermal treatment protocols. The thermal treatment transforms dense glassy polymer precursors with low free volume, to microporous materials with interconnected microcavities with a narrow cavity size distribution. Such change of microporous structure results in highly permeable and selective membranes with exceptional gas transport properties, especially in sieving light gas molecules from large molecules. For example, the $CO_2$ permeability of a representative TR polymer is as high as 1600 Barrer while the $CO_2/CH_4$ selectivity is stable at about 50 with negligible plasticization effect at high pressure. In all of these TR process, the heat treatment were prepared in inert atmosphere, and the role of oxygen was not studied and poorly understood.

Heat treatment of polymer at high temperature (>500° C.) in inert atmosphere result in pyrolysis of polymer to carbon materials. International patent WO2011053403 A1 and articles by Koros and co-workers [NPL 30-31, papers by Koros and coworkers] discloses a process of controlled pyrolysis of polymer membranes by adjusting the concentration of oxygen in the pyrolysis atmosphere, to generate a microporous carbon molecular sieves (CMS) membranes for gas separation. The CMS membranes have tuneable gas separation performance in terms of selectivity and permeability that surpasses the upper bound of polymeric membranes. However, the CMS membranes have limited mechanical properties due to thermal treatment at high temperature (>500° C.).

Mixed matrix membranes (MMMs) or nanocomposite membranes are prepared by incorporation of molecular sieves or nanoparticles into polymer matrix. MMMs or nanocomposite membranes have been an active research area. A promising system is incorporation novel metal-organic frameworks crystals into polymer matrix [NPL 32-34]. Alternatively, non-porous inorganic nanoparticles could also be used a fillers for polymer nanocomposites [NPL 35]. International patent WO2007084169 A2 and US patent US 20070137477 A1 reported a method, composition and apparatus for forming a nanoparticle filled polymer having similar gas selectivity and higher gas permeability than the native polymers. The nanoparticles fillers are dispersed in polymeric materials to increase the permeability of the composite materials. International patent WO2007106677 A2 (application number PCT/US2007/063305) discloses the preparation of high flux mixed matrix membranes made by incorporating porous inorganic fillers (e.g. microporous and mesoporous molecular sieves, carbon molecular sieves, porous metal-organic frameworks) into PIMs for separations. However, the selectivity of these mixed matrix membranes are not significantly improved. For any type of fillers, either nanoparticles or porous molecular sieves, the properties of the polymer composites would largely depend on the properties of the polymer matrix itself. It is expected that covalently crosslinking of the polymer would also be effective to form the network structure filled by various types of fillers.

In summary, it is desirable to develop new processing methods to covalently crosslink novel microporous polymers while modifying and optimizing the structure of free volume elements or micropores to achieve much better molecular separation in terms of high permeability and selectivity that satisfying practical membrane separations, to improve the stability to chemicals and solvents that would allow their use as high-performance adsorbents or separation of chemicals and solvents, and many other applications.

CITATION LIST

Patent literature

[PTL 1] WO2003000774
[PTL 2] WO2005012397
[PTL 3] WO2006047423
[PTL 4] WO 2005113121
[PTL 5] WO2010124359
[PTL 6] WO2010048694
[PTL 7] WO2011057384A1
[PTL 8] U.S. Pat. No. 7,758,751 B1.
[PTL 9] US 20130247756 A1.
[PTL 10] WO2009113747 A1.
[PTL 11] WO2012167114A2.
[PTL 12] WO2012166153A1.
[PTL 13] WO2011053403A1.
[PTL 14] WO2007084169A2
[PTL 15] WO2007106677

Non-Patent Literature

[NPL 1] Lai, Z. et al., Microstructural Optimization of a Zeolite Membrane for Organic Vapor Separation. *Science* 300, 456-460 (2003).

[NPL 2] Varoon, K. et al., Dispersible Exfoliated Zeolite Nanosheets and Their Application as a Selective Membrane. *Science* 334, 72-75 (2011).

[NPL 3] Yaghi, O. M. et al., Reticular synthesis and the design of new materials. *Nature* 423, 705-714 (2003).

[NPL 4] Furukawa, H. et al., Ultrahigh Porosity in Metal-Organic Frameworks. *Science* 329, 424-428 (2010).

[NPL 5] Park, K. S. et al., Exceptional chemical and thermal stability of zeolitic imidazolate frameworks. *Proc. Natl. Acad. Sci. U. S. A.* 103, 10186-10191 (2006).

[NPL 6] Hayashi, H. et al., Zeolite A imidazolate frameworks. *Nat. Mater.* 6, 501-506 (2007).

[NPL 7] Freeman, B. D., Basis of Permeability/Selectivity Tradeoff Relations in Polymeric Gas Separation Membranes. *Macromolecules* 32, 375-380 (1999).

[NPL 8] Robeson, L. M., The upper bound revisited. *J. Membr. Sci.* 320, 390-400 (2008).

[NPL 9] Lin, H. et al., Plasticization-Enhanced Hydrogen Purification Using Polymeric Membranes. *Science* 311, 639-642 (2006).

[NPL 10] Park, H. B. et al., Polymers with Cavities Tuned for Fast Selective Transport of Small Molecules and Ions. *Science* 318, 254-258 (2007).

[NPL 11] Park, H. B. et al., Thermally rearranged (TR) polymer membranes for CO2 separation. *J. Membr. Sci.* 359, 11-24 (2010).

[NPL 12] Budd, P. M. et al., Solution-Processed, Organophilic Membrane Derived from a Polymer of Intrinsic Microporosity. *Adv. Mater.* 16, 456-459 (2004).

[NPL 13] McKeown, N. B. et al., Polymers of intrinsic microporosity (PIMs): Bridging the void between microporous and polymeric materials. *Chemistry—A European Journal* 11, 2610-2620 (2005).

[NPL 14] Budd, P. M. et al., Gas separation membranes from polymers of intrinsic microporosity. *J. Membr. Sci.* 251, 263-269 (2005).

[NPL 15] McKeown, N. B. & Budd, P. M., Polymers of intrinsic microporosity (PIMs): Organic materials for membrane separations, heterogeneous catalysis and hydrogen storage. *Chem. Soc. Rev.* 35, 675-683 (2006).

[NPL 16] Du, N. et al., Polymer nanosieve membranes for CO2-capture applications. *Nat. Mater.* 10, 372-375 (2011).

[NPL 17] Carta, M. et al., An Efficient Polymer Molecular Sieve for Membrane Gas Separations. *Science* 339, 303-307 (2013).

[NPL 18] Nagai, K. et al., Poly[1-(trimethylsilyl)-1-propyne] and related polymers: Synthesis, properties and functions. *Prog. Polym. Sci.* 26, 721-798 (2001).

[NPL 19] Côté et al, Porous, Crystalline, Covalent Organic Frameworks. *Science* 310 1166-1170 (2005)

[NPL 20] El-Kaderi, H. M. et al., Designed synthesis of 3D covalent organic frameworks. *Science* 316, 268-272 (2007).

[NPL 21] Tozawa, T. et al., Porous organic cages. *Nat. Mater.* 8, 973-978 (2009).

[NPL 22] Jones, J. T. A. et al., Modular and predictable assembly of porous organic molecular crystals. *Nature* 474, 367-371(2011).

[NPL 23] Bushell, A. F. et al., Nanoporous Organic Polymer/Cage Composite Membranes. *Angew. Chem., Int. Ed.* 52, 1253-1256 (2013).

[NPL 24] Mason et al, Polymer of Intrinsic Microporosity Incorporating Thioamide Functionality: Preparation and Gas Transport Properties. *Macromolecules,* 44, 6471-6479 (2011)

[NPL 25] Song, Q. et al., Photo-oxidative enhancement of polymeric molecular sieve membranes. *Nat. Commun.* 4, 1918 (2013).

[NPL 26] N. Du et al., Azide-Based Cross-Linking of Polymers of Intrinsic Microporosity (PIMs) for Condensable Gas Separation. *Macromol. Rapid Commun.* 32, 631-636 (2011)

[NPL 27] Kratochvil, A. M. & Koros, W. J., Decarboxylation-Induced Cross-Linking of a Polyimide for Enhanced CO2 Plasticization Resistance. *Macromolecules* 41, 7920-7927 (2008).

[NPL 28] Du et al, Decarboxylation-Induced Cross-Linking of Polymers of Intrinsic Microporosity (Pims) for Membrane Gas Separation. *Macromolecules* 45, 5134-5139 (2012)

[NPL 29] F. Y. Li, Y. Xiao, T.-S. Chung, S. Kawi, High-Performance Thermally Self-Cross-Linked Polymer of Intrinsic Microporosity (PIM-1) Membranes for Energy Development. *Macromolecules* 45, 1427-1437 (2012)

[NPL 30] Kiyono, M., Williams, P. J., & Koros, W. J., Effect of pyrolysis atmosphere on separation performance of carbon molecular sieve membranes. *J. Membr. Sci.* 359, 2-10 (2010).

[NPL 31] Kiyono, M., Williams, P. J., & Koros, W. J., Generalization of effect of oxygen exposure on formation and performance of carbon molecular sieve membranes. *Carbon* 48, 4442-4449 (2010).

[NPL 32] Bae, T.-H. et al., A High-Performance Gas-Separation Membrane Containing Submicrometer-Sized Metal-Organic Framework Crystals. *Angew. Chem., Int. Ed.* 49, 9863-9866 (2010).

[NPL 33] Song, Q. et al., Zeolitic imidazolate framework (ZIF-8) based polymer nanocomposite membranes for gas separation. *Energy Environ. Sci.* 5, 8359-8369 (2012).

[NPL 34] Merkel, T. C. et al., Ultrapermeable, reverse-selective nanocomposite membranes. *Science* 296, 519-522 (2002).

[NPL 35] B G Ghanem, N B McKeown, P M Budd, N M Al-Harbi, D Fritsch, K Heinrich, L Starannikova, A Tokarev and Y Yampolskii, Synthesis, characterization, and gas permeation properties of a novel group of polymers with intrinsic microporosity: PIM-polyimides", Macromolecules, 42, 7781-7888, 2009.

SUMMARY OF INVENTION

Technical Problem

The object of the invention is to provide a crosslinked polymer useful as polymeric molecular sieves composition and material separation membranes which are thermally, chemically and mechanically stable, and have remarkable selectivity and permeability.

Solution to Problem

The present invention provides the following items 1 to 12.

[Item 1] A process for thermal crosslinking of polymers of intrinsic microporosity (PIMs) by heat treatment of PIMs under controlled oxygen concentration.

[Item 2] The process according to Item 1 wherein heat treatment is conducted at a temperature ranging from about 300 to about 500° C., preferably about 350 to about 450° C.

[Item 3] The process according to Item 1 wherein oxygen concentration is in the range of about 0-100 vol. %, preferably about 0-200 ppm, more preferably about 0-100 ppm.

[Item 4] The process according to Item 2 or 3, which can be followed by heat treatment in inert atmosphere or high vacuum.

[Item 5] A crosslinked polymer of intrinsic microporosity (PIM) produced by the process according to any one of Items 1 to 4

[Item 6] A molecular sieve composition comprising the crosslinked polymer according to Item 5 and a porous or nonporous filler.

[Item 7] The composition according to Item 6 wherein said filler is selected from the group consisting of metal-organic frameworks (MOFs), zeolitic imidazolate frameworks (ZIFs), inorganic molecular sieves (zeolites), coordination organic polymers (COFs) and porous organic cages (POCs), preferably with size in the range of 1-1000 nm, and most preferably below 100 nm.

[Item 8] The composition according to Item 6 for use as materials for membrane-based gas separation, hydrocarbons and vapour separation, materials for adsorbents, materials for catalysts supports, materials for ionic conductive matrix, or materials for sensors.

[Item 9] The composition according to Item 6 wherein said filler is selected from the group consisting of nanoparticles made of silica and titanium oxide and other inorganic materials.

[Item 10] A material separation membrane comprising the crosslinked polymer according to Item 5 and a porous or nonporous filler.

[Item 11] A material separation membrane comprising the polymer according to Item 5 and a porous or nonporous filler, wherein the membrane is for use in nitrogen separation from air, oxygen enrichment from air, hydrogen separation from nitrogen and methane, carbon dioxide separation from natural gas, natural gas separation, olefin/paraffin separation such as propylene/propane, carbon dioxide separation from flue gas.

[Item 12] The material separation membrane according to Item 10 or 11, wherein the membrane is for separating carbon dioxide, hydrogen, carbon monoxide, oxygen, nitrogen, hydrocarbons having 1 to 4 carbon atoms, noble gases, hydrogen sulfide, ammonia, sulfur oxides, nitrogen oxides, siloxanes, water vapor, or organic vapor.

Advantageous Effects of Invention

The polymers of the present invention are useful as materials in solid state forms, for membrane-based gas separation, materials for sorbents for gas and chemicals, materials for ion-conductive matrixes, materials for sensors, or materials for supports for catalysts. In the membrane form, the membranes have tailored gas transport and sorption properties with enhanced selectivity and/or permeability, and enhanced stability to chemicals or solvents. Under controlled atmosphere of heat treatment, including the temperature, $O_2$ concentration, and exposure time, we could precisely tune the degree of thermal oxidation and crosslinking of the polymer, and their gas separation performance.

BRIEF DESCRIPTION OF DRAWINGS

FIG. 1 Synthesis and chemical structure of a polymer of intrinsic microporosity (PIM-1).

FIG. 2 Schematic diagram of thermally oxidative crosslinked microporous polymers. (A) An ideal molecular model of a polymer of intrinsic microporosity (PIM-1) polymer chain segment. (B) Three-dimensional view of an amorphous cell of PIM-1 polymer (four polymer segments inside, each containing 10 repeating units). Cell size: 31.8×31.8× 31.8 Å. The grey surface indicates the van der Waals surface, green surface is the Connolly surface with probe radius of 1.65 Å (kinetic radius of a $CO_2$ molecule). (C) Two-dimensional schematic illustration of transformation of independent PIM-1 polymer chains (black contorted lines) to (D) covalently crosslinked polymer network via thermal oxidation in the presence of trace amount of oxygen molecules. (E) Two-dimensional schematic illustration of the interconnected free volume elements in PIM-1 polymer and (F) thermal oxidative crosslinked PIM polymer with narrower or closed gate (indicated by dashed circles) between interconnected cavities. White regions indicate the accessible free volume, grey regions indicates the inaccessible pore walls.

FIG. 3 Thermogravimetric analyses of PIM-1 polymer membranes. Dynamic heating under purging gas of air (oxidation, thick lines) and argon (pyrolysis, thin lines), and 200 ppm $O_2$ in argon (dashed lines). The polymer films were heated from room temperature to 1000° C. at 10° C./min.

FIG. 4 Thermal analysis and ex situ FTIR spectra of dense polymer films. a, Isothermal TGA analyses of PIM-1 polymer films over 300-450° C. b, FTIR-ATR spectra of polymer films after isothermal TGA analyses. The accelerated thermal oxidation indicates that the membranes maintain in polymeric state after weight loss up to 1.5-2.5 wt %.

FIG. 5 Solubility tests. Solubility of fresh PIM-1 (1) and thermally crosslinked PIM-1 membranes in common solvents (2-20). (1) Chloroform, (2) Chloroform, (3) Tetrahydrofuran, (4) Dichloromethane, (5) Chlorobenzene, (6) 1,2 Dichlorobenzene, (7) N-Methyl-2-pyrrolidone (NMP), (8) Dimethylformamide (DMF), (9) 1,4 Dioxane, (10) Acetone , (11) Dimethyl sulfoxide (DMSO), (12) Toluene,

(13) Hexane, (14) Cyclohexane, (15) Acetic acid, (16) Isopropanol, (17) Ethanol, (18) methanol, (19) Diluted HCl, 32%, (20) NaOH (20 wt %) in water.

FIG. 6 Molecular weight distribution and gel content. (A-B) Effect of temperature and (C-D) effect of reaction time. (A) and (C) Molecular weight distributions of soluble fractions of polymer membranes after exposure to thermal treatment. (B) and (D) Gel content analysis and peak molecular weight of soluble fractions of PIM-1 polymer membranes. The polymer membranes were heated at 385° C. under continuous vacuum (1 mbar) up to 24 h.

FIG. 7 Stress-strain curves of PIM-1 and thermally cross-linked PIM-1 membranes.

FIG. 8 Cross-sectional SEM images. (a-b) pure PIM-1 polymer membranes, and (c) thermally crosslinked PIM-1 membrane. (d-e) PIM-1/ZIF-8 nanocomposite membranes, and (f) thermally crosslinked PIM-1/ZIF-8. (g-h) PIM-1/$SiO_2$ nanocomposite membranes, and (i) thermally crosslinked PIM-1/$SiO_2$. (c), (f), and (i) were thermally oxidative crosslinked at 385° C. for 24 h under vacuum (1 mbar).

FIG. 9 Cross-sectional SEM images of thermally crosslinked PIM-1 thin films. The thin films were casted on different substrates (a) glass and (b) silicon wafer and became insoluble in chloroform, the solvent that dissolves the original PIM-1 polymer.

FIG. 10 Thermal analyses of fresh PIM-1 and thermally crosslinked (TXL) PIM-1 polymer membranes. The membranes were heated in argon at a heating rate of 10° C./min. The thermally crosslinked membrane was prepared by curing at 385° C. for 24 h under vacuum of 1 mbar.

FIG. 11 Wide angle X-ray scattering of thermally treated PIM-1 polymer films.

FIG. 12 Ex situ FTIR spectra of polymer membranes. A, Thermally treated PIM-1 membranes. B, Thermally treated PIM-1/ZIF-8 nanocomposite membranes. All samples were annealed under vacuum for 24 h, except that the samples at 300° C. were annealed for 48 h.

FIG. 13 $N_2$ adsorption-desorption isotherms of PIM-1 thin film and dense membranes at 77 K. Squares: PIM-1 thin film (300 nm) dried at 120° C. under vacuum; Circles: Dense PIM-1 membranes annealed at 120° C. under vacuum; Up-triangles: Dense PIM-1 membranes annealed at 300° C. for 48 h under vacuum; Down-triangles: Thermally crosslinked PIM-1 membrane at 385° C. for 24 h under vacuum (1 mbar).

FIG. 14 $N_2$ adsorption-desorption isotherms of PIM-1/ZIF-8 nanocomposite membranes at 77 K. Squares: annealed at 120° C. for 24 h; Circles: thermally crosslinked at 385° C. for 24 h under vacuum. The loading of ZIF-8 nanocrystals was 20 wt %.

FIG. 15 Gas sorption of unmodified PIM-1 (and TXL-PIM-1 membranes at 273 K.

FIG. 16 Gas sorption of PIM-1/ZIF-8 (Open symbols) and thermally crosslinked TXL-PIM-1/ZIF-8 membranes (solid symbols), measured at 273 K.

FIG. 17 High-pressure gas sorption of unmodified PIM-1 (Open symbols) and thermally crosslinked TXL-PIM-1 (solid symbols) membranes, measured at room temperature of 295 K.

FIG. 18 Permeability versus kinetic diameter of gas molecules of PIM-1 and a representative thermally crosslinked TXL-PIM-1 membranes. Lines are added to guide eyes. The TXL-PIM-1 membrane was cured at 385° C. for 24 h under vacuum (1 mbar).

FIG. 19 Solubility (S) and diffusion coefficients (D) for PIM-1 and thermally crosslinked TXL-PIM-1 membranes. a, Solubility as a function of critical temperature ($T_C$) of gas molecules. b, Diffusion coefficients as a function of square of effective molecular diameter ($d_{eff}$) of gas molecules. Lines are added to guide eyes. The TXL-PIM-1 membrane was cured at 385° C. for 24 h under vacuum (1 mbar).

FIG. 20 Gas transport properties as a function of thermal crosslinking time. a, Permeability. b, Selectivity. The membranes were thermally treated at 385° C. under vacuum.

FIG. 21 Sensitivity of gas transport properties to oxygen during thermal oxidative crosslinking. a, Permeability and b, selectivity of membranes thermally treated at 385° C. at for 1 h under varied vacuum pressure. c, Permeability and d, selectivity of membranes thermally treated at 385° C. for 24 h under continuous purge gas containing varied concentration of $O_2$ over extended time.

FIG. 22 Gas transport properties. Plot of $CO_2/CH_4$ selectivity versus $CO_2$ permeability. Commercial polymers are included for comparison: cellulose acetate (CA); ethyl cellulose (EC); polycarbonate (PC); Matrimid® 5218 polyimide (PI); polyetherimide (PEI); polyphenyleneoxide (PPO); polysulfone (PSF). Black lines: upper bound of polymer membrane in 2008. Open squares: PIM-1 in literature; solid triangles: other PIMs in literature. Solid squares (black): PIM-1; Solid squares (red): TXL-PIM-1 membranes prepared at different thermal treatment conditions.

FIG. 23 Summary of representative gas transport properties. Selectivity versus permeability of PIM-1 and thermally crosslinked PIM-1 membranes for industrially important gas pairs. (A) $H_2/CH_4$, (B) $H_2/N_2$, (C) $O_2/N_2$, (D) $CO_2/N_2$. Red lines: upper bound of polymer membrane. Commercial polymers (grey regions) are included for comparison. Open squares: PIM-1 in literature; Solid triangles (yellow regions): other PIMs in the literature; Open circles: TR polymers; Solid squares (black): PIM-1 membrane; Solid squares (red): TXL-PIM-1 membranes under different thermal treatment conditions.

FIG. 24 Mixed gas separation performance. Permeability and selectivity of PIM-1 and thermally crosslinked PIM-1 membranes for (a-b) $CO_2/CH_4$ mixture (50/50 vol. %) and (c-d) $CO_2/N_2$ mixture (50/50 vol. %).

FIG. 25 Gas permeation properties of thermally crosslinked PIM-1 nanocomposite membranes. (a) Permeability, (b) selectivity, (c) Diffusion coefficient and (d) solubility. The volume fractions of fillers correspond to weight loading of nano-sized silica (1, 2. 5, 10, 20 wt % and ZIF-8 nanoparticles (5, 10, 20 wt %).

FIG. 26 Gas transport properties of thermally crosslinked PIM-1 nanocomposite membranes. Representative samples include TXL-PIM-1/$SiO_2$ with silica nanoparticles loadings of 1, 2, 5, 10, 20 wt %, respectively; TXL-PIM-1/ZIF-8 with ZIF-8 loading of 5, 10, 20 wt %, respectively. Samples were thermally crosslinked at 385° C. for 24 h under vacuum of 1 mbar. The arrow from TXL-PIM-1 to TXL-PIM-1/filler indicates the increase of volume fraction of filler.

DESCRIPTION OF EMBODIMENTS

In this work, using PIM-1 polymer as a prototypical disordered organic framework, we demonstrate a simple thermal processing method of transforming independent rigid polymer chains to covalently crosslinked polymer networks with significantly enhanced molecular-sieving selectivity and exceptional gas separation performances. As visualized in FIG. 2, from a microscopic point of view, the loosely packed high-free-volume polymer matrix behaves as a series of connected nano-reactors, which allows sorption and fast diffusion of oxygen molecules through the gates between the interconnected chambers (FIG. 2E). Thermo-dynamically, the $O_2$ molecules in motion migrate between interconnected microcavities through gates. Because there is a broad size distribution of channels, the $O_2$ molecules should migrate preferentially through the largest channels with the least resistance. Upon heating in the presence of oxygen, and at suitable temperature (about 350-450° C.), oxidation and crosslinking of polymer chains occur preferentially at the gates. This results in narrower (or closed) gates with better molecular-sieving function (FIG. 2F), while the overall free volume, statistically, is still sufficiently high allowing high solubility and fast diffusion of light gas molecules.

[Crosslinked Polymer]

In this invention, crosslinked polymers are used for separation of gas or liquid materials. Polymers to be crosslinked include polymers of intrinsic microporosity (PIMs). Chemical structures of some representative PIMs are shown below.

The first generation of non-network PIMs via dibenzodioxin formation reactions are synthesized according to the synthetic pathway and monomers for PIMs as shown below.

[Chem. 2]

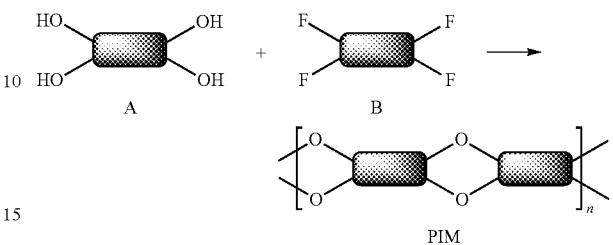

[Chem. 1]

PIM-1

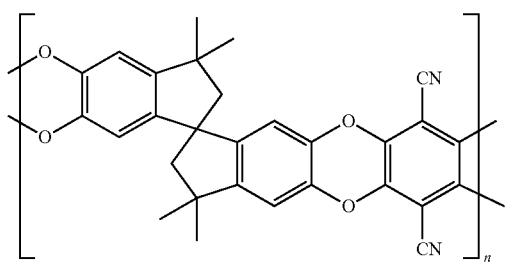

PIM-7

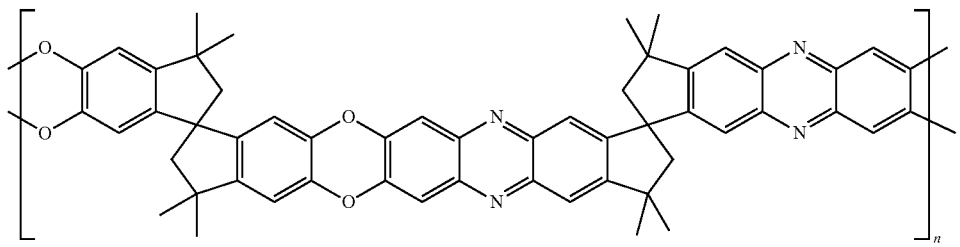

PIM-polyimide

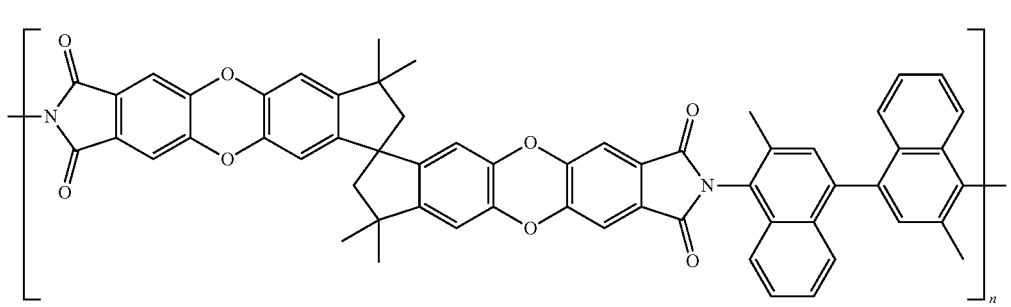

PIM-EA-TB

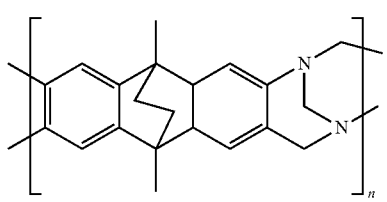

-continued
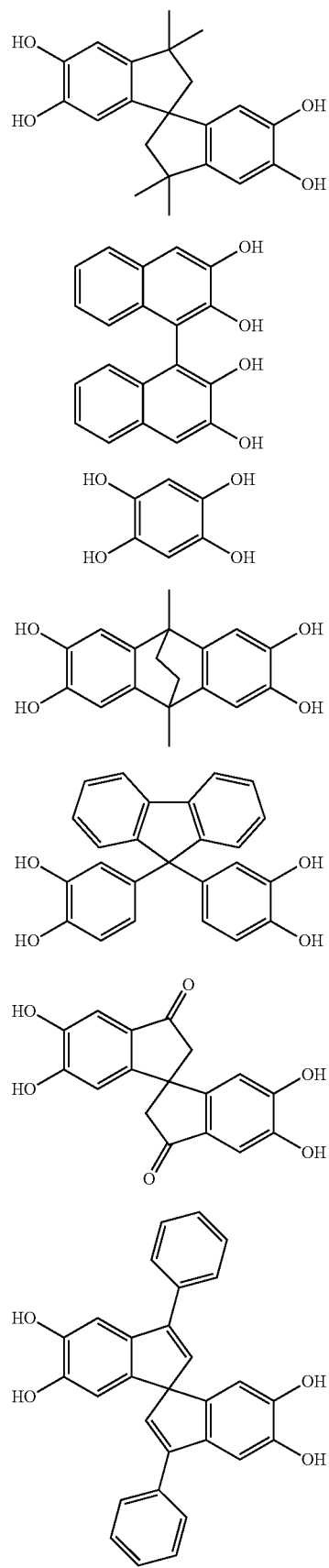
A1
A2
A3
A4
A5
A6
A7
-continued
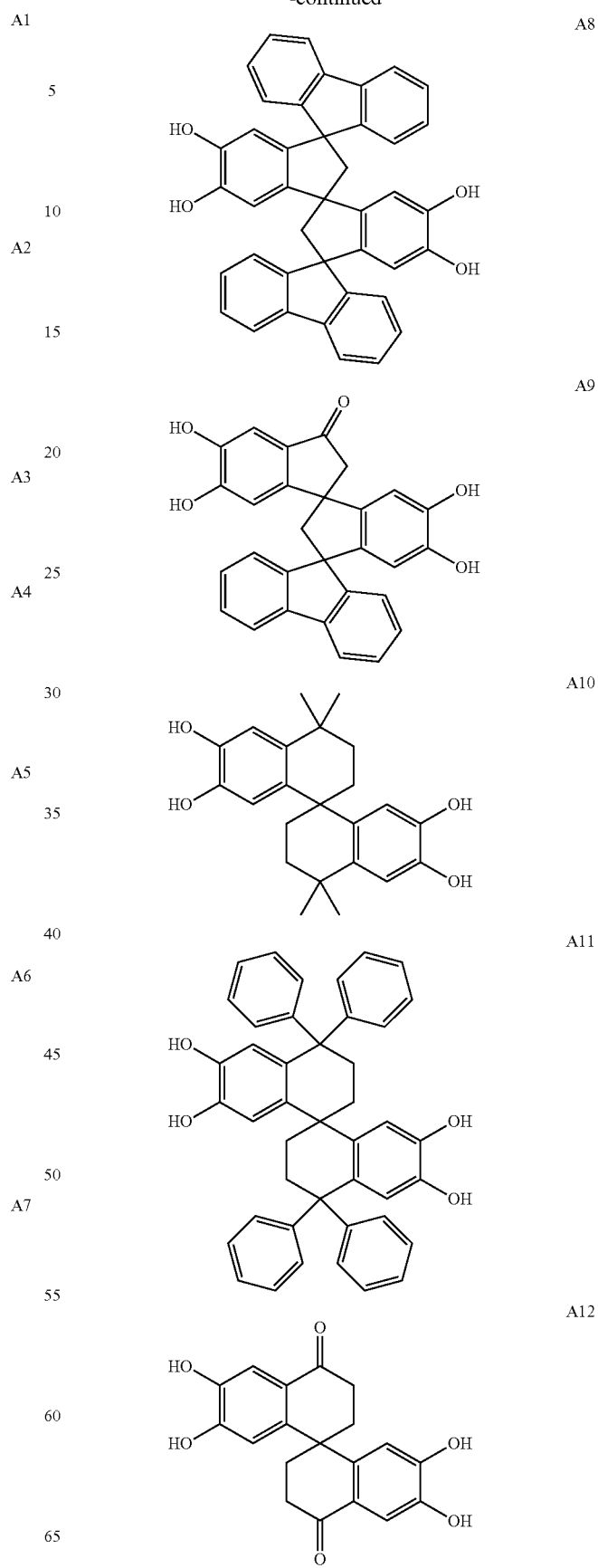
A8
A9
A10
A11
A12

-continued
A13
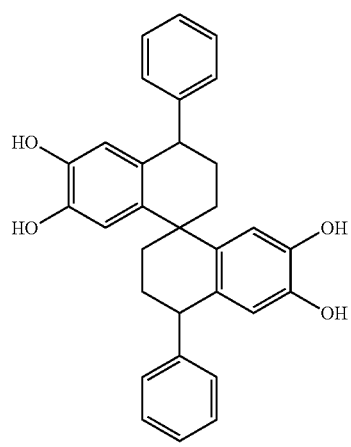
A14
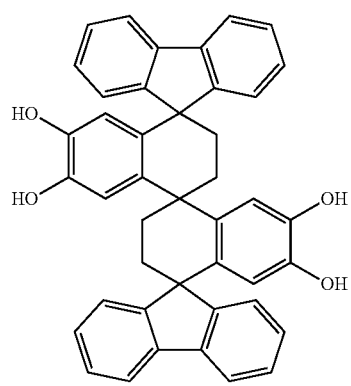
A15
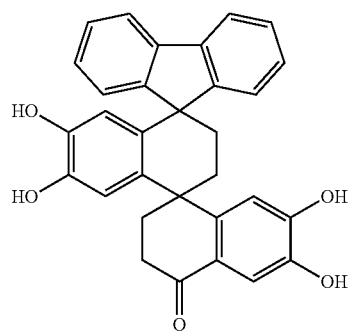
A16
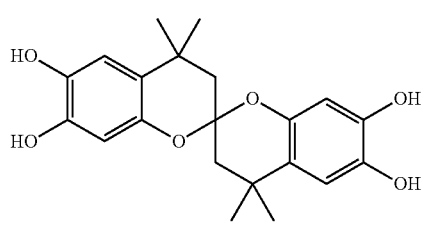
-continued
A17
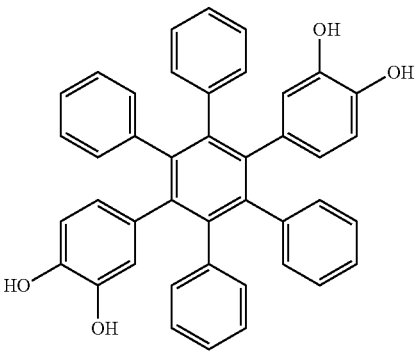
A18
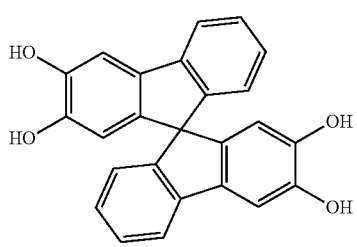
A19
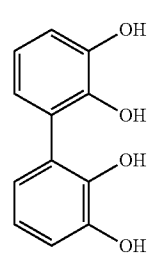
A20
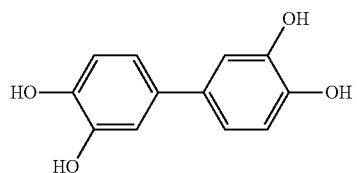
A21
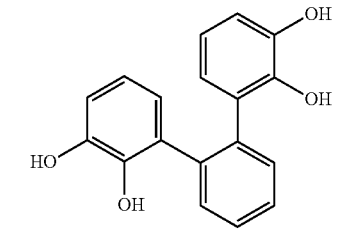
A22
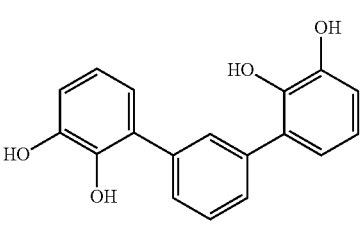

A23 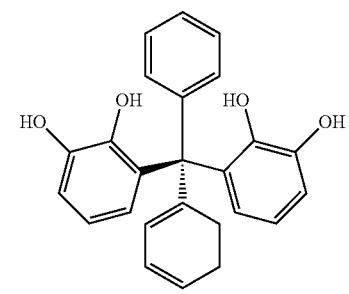
A24 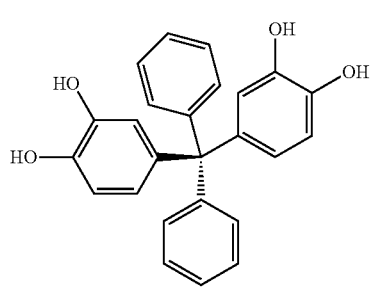
B1 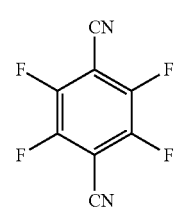
B2 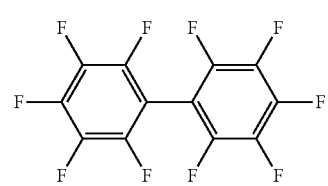
B3 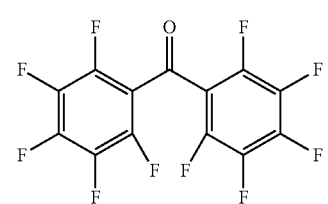
B4 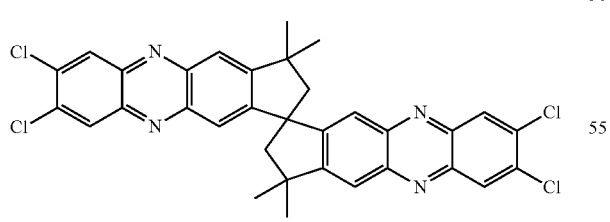
B5 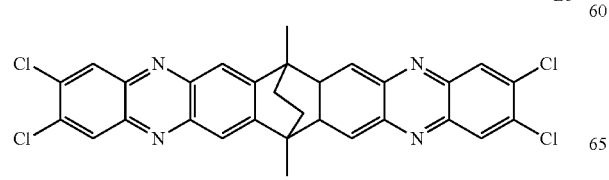
B6 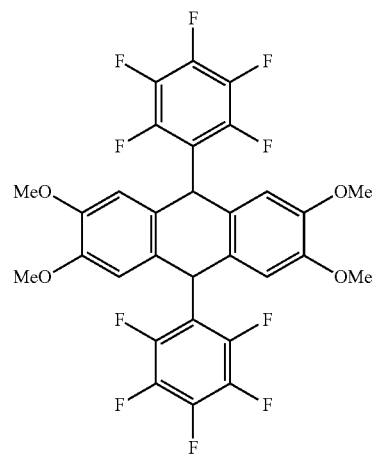
B7 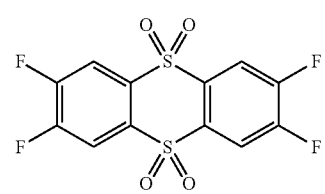
B8 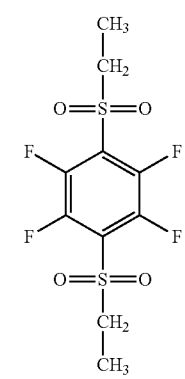
B9 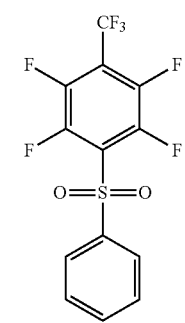

-continued
B10
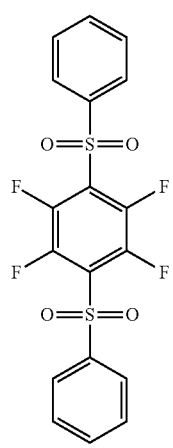
B11
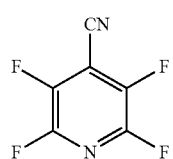
B12
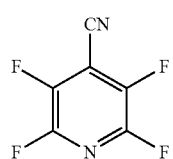
-continued
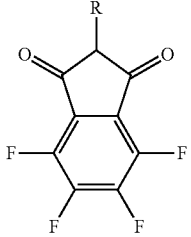
R = 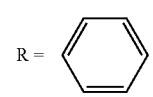  B13
R = 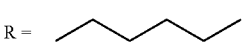  B14
R = 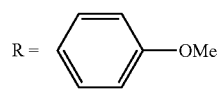  B15
R = 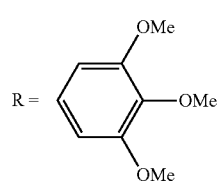  B16
R = 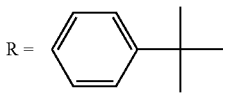  B17
R = 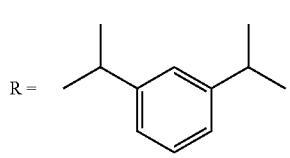  B18

-continued
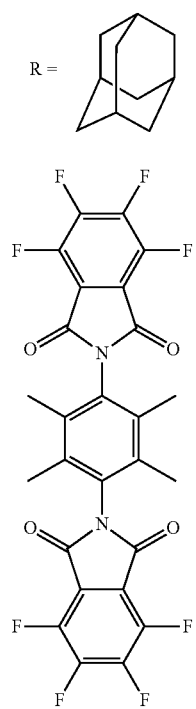
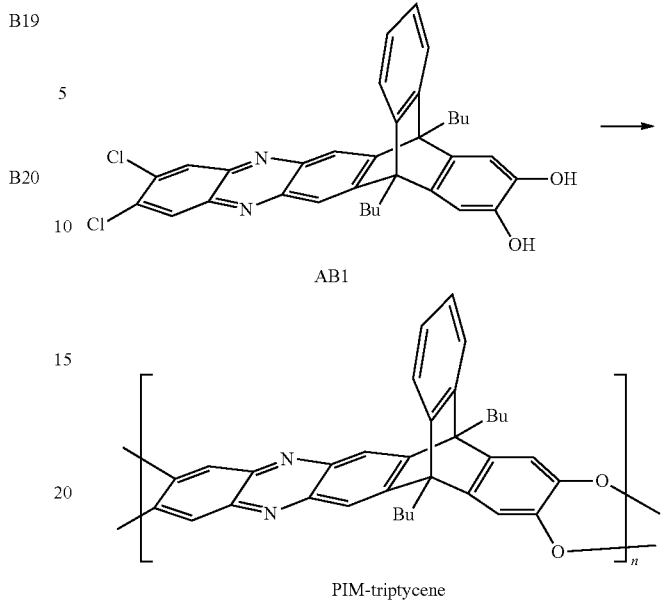
Synthesis of polyimides with intrinsic microporosity (PIM-PI) are shown below. The synthetic pathway follows cycloimidiiation reaction between a bis(carboxylic anhydride) (X including X1 to X6) and a diamine (Y including Y1 to Y12).
[Chem. 3]
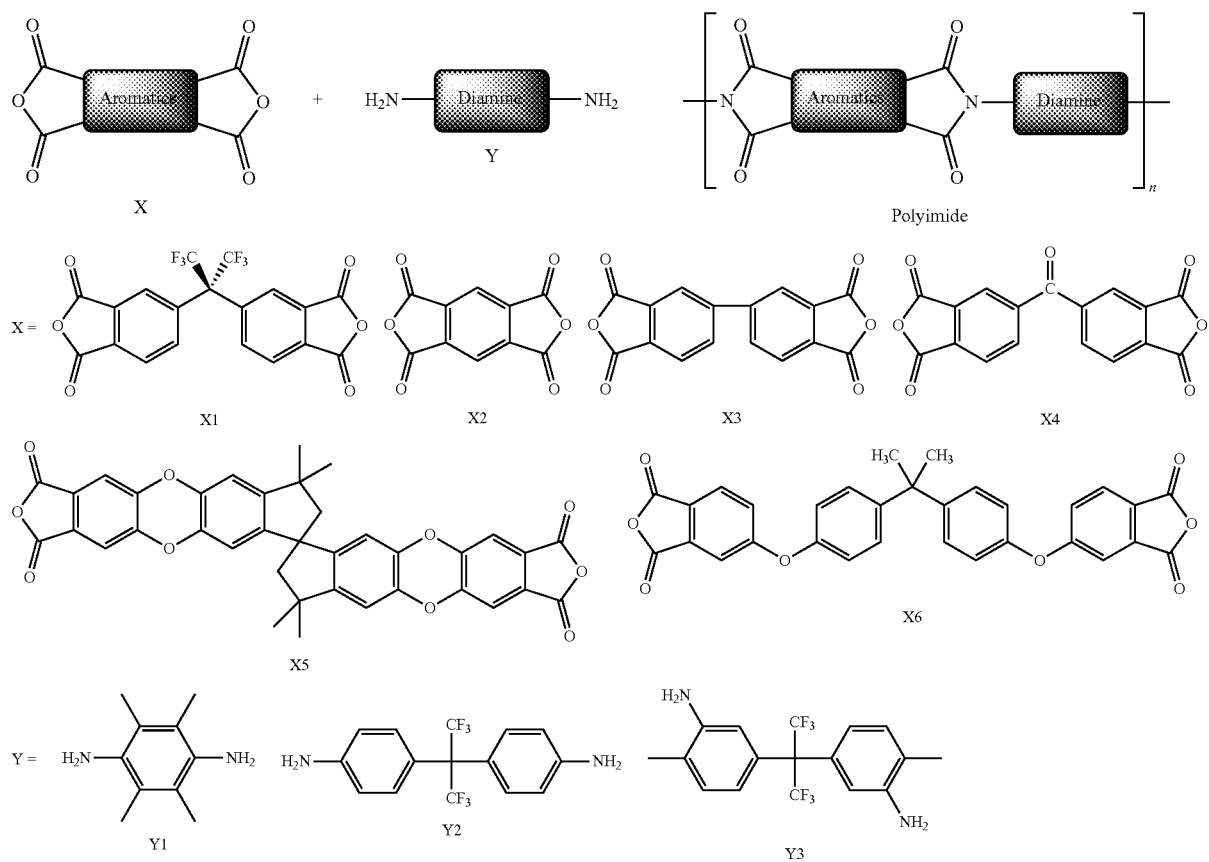

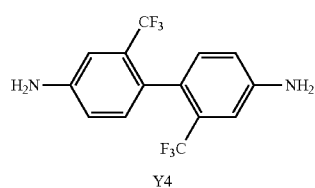 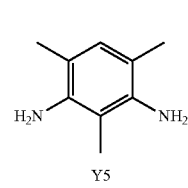 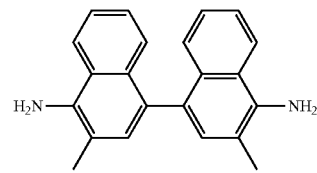

-continued

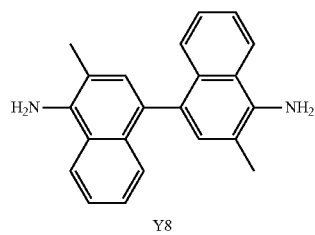 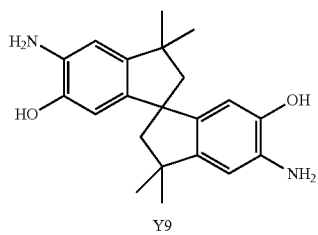 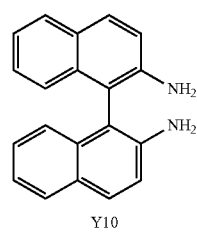 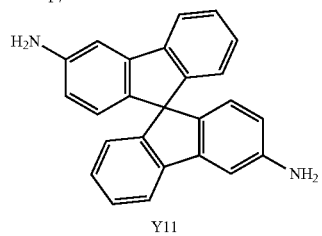

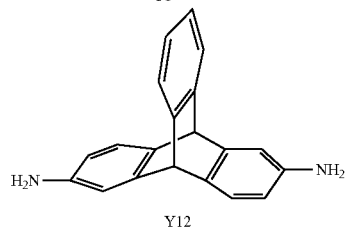

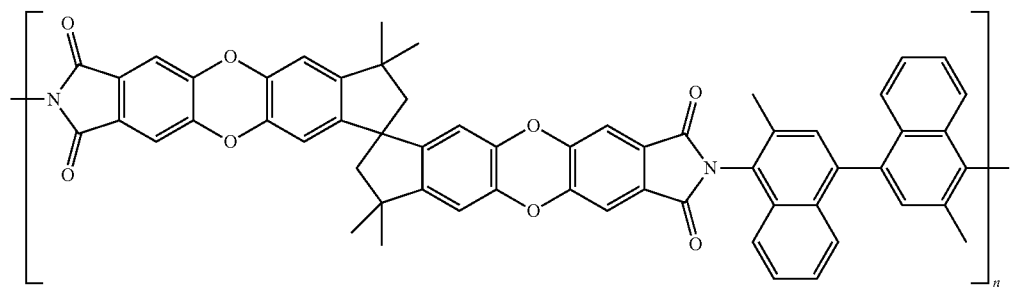

PIM-PI-8

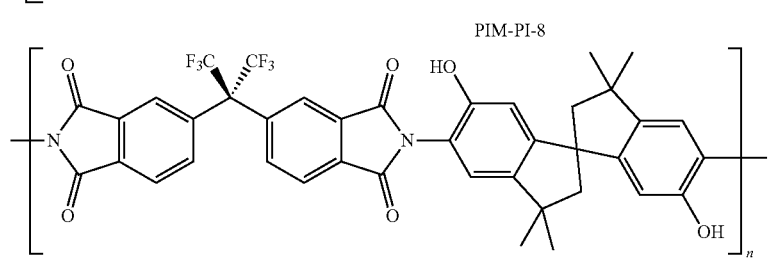

PIM-6FDA-OH

Typical examples of soluble non-network PIMs polymers are PIM-1 and PIM-7. PIM-1 is polymerized from 5,5',6,6'-tetrahydroxy-3,3,3',3'-tetramethylspirobisindane and 2,3,5,6-tetrafluoroterephthalonitrile by double aromatic nucleophilic substitution polycondensation. The synthetic chemistry allows versatile combination of monomers with different geometry, such as tuning the angles of the contorted sites, molecular length between the contorted sites, and pendant groups on the polymer backbone. Generally, changing the chemical structures of monomers could tune the rigidity of the polymer backbones and consequently the gas transport properties. However, they generally show high permeability and moderate selectivity, which are close or higher than the Robeson's upper bound.

Polyimides with intrinsic microporosity (PIM-polyimides) were synthesized following the conventional cycloimidization reaction pathways, with spirobisindane-containing monomers of bis(carboxylic anhydride) and a diamine. Two types of synthetic pathways were developed via combination of either spirobisindane-containing bis(carboxylic anhydride), or spirobisindane-containing diamine, as shown above. The molecular structures of PIM-polyimides are similar to that of PIM-1 and PIM-7, with addition of imide linkages The essential idea is incorporating the spirobisindane unit into the polymer backbone, which provides a site of contortion. Similar to PIM-1, PIM-polyimides also show high fractional free volume and give high permeability and modest selectivity that allow the overall gas separation performance close to the Robeson's upper bound. [B G Ghanem, N B McKeown, P M Budd, N M Al-Harbi, D Fritsch, K Heinrich, L Starannikova, A Tokarev and Y Yampolskii, Synthesis, characterization, and gas permeation properties of a novel group of polymers with intrinsic microporosity: PIM-polyimides", Macromolecules, 42, 7781-7888, 2009].

A new synthetic pathway was recently developed by McKeown's group to synthesize more rigid polymers while maintaining large interchain spacings. The polymerization pathway was inspired by the Tröger's base (TB), bridged bicyclic amine 2,8-dimethyl-6H,12H-5,11-methanodibenzo[b,f][1,5]diazocine. They designed rigid aromatic diamine monomers, for example, 2,6(7)-diamino-9,10-dimethylethanoanthracene (A) and 5,5',(6),(6')-diamino-3,3,3',3'-tetramethyl-1,1'-spirobisindane (B), for the TB polymerization reaction and generated rigid ladder polymer consisting of fused-rings. [Carta et al., An Efficient Polymer Molecular Sieve for Membrane Gas Separations. Science 339, 303-307 (2013)]

[Chem. 4]

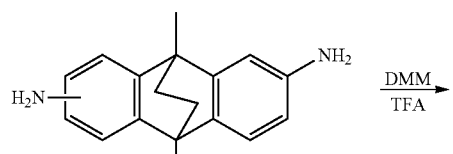

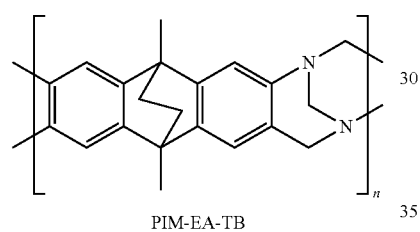

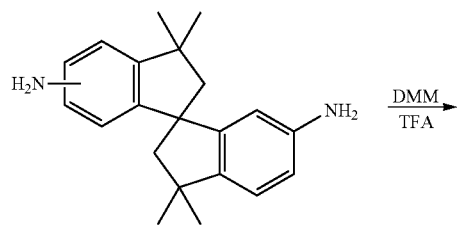

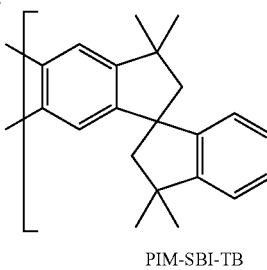

PIM-SBI-TB

Synthesis of new PIMs based on Tröger's base (TB)
DMM: dimethoxyethane

The existing PIMs polymers could also be modified chemically via post-synthetic modifications, such as modification of nitrile groups, including hydrolysis to carboxylic acids, reaction of sodium nitride to tetrazole groups, reaction with $P_2S_5$ to thioamides, and reaction of hydroxylamine to amidoximes, as shown below.

[Chem. 5]

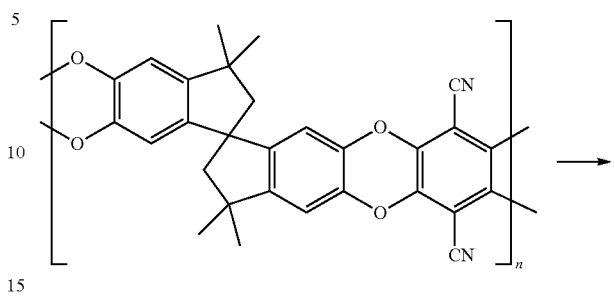

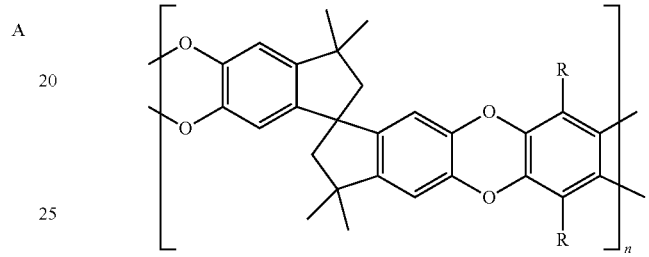

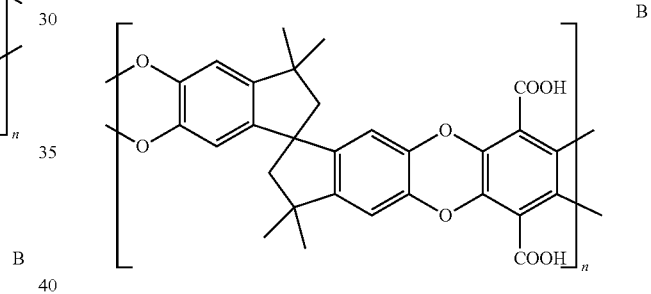

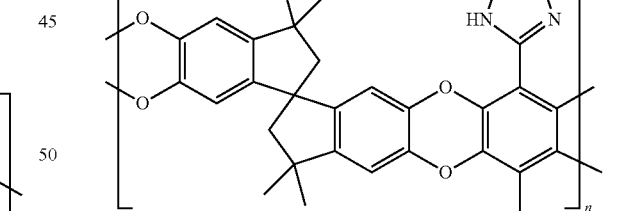

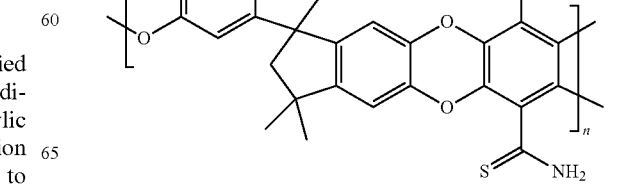

-continued

E

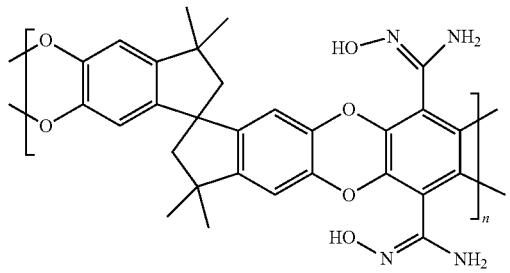

[R Represents COOH, tetrazolyl, CS—NH$_2$ or C(=N—OH)NH$_2$.]

(A) Post-synthetic modification of nitrile group in PIM-1 polymer. (B) hydrolysis to carboxylic acids, (C) reaction of sodium nitride to tetrazole groups, (D) reaction with P$_2$S$_5$ to thioamides, (E) reaction of hydroxylamine to amidoximes.

A common characteristic of all these PIMs polymers is the inefficient packing of rigid polymer chains, which generates interconnected free volume elements or cavities. The gas permeation in PIMs polymer matrix could be illustrated by the solution-diffusion model, that is, the sorption of gas is governed by the free volume elements while the diffusion is limited by the size of the interconnected gates. At the microscopic level, the amorphous nature of PIMs polymer chains results in a broad size distribution of free volume elements (4 to 10 Å) exists in all the PIMs polymers, and compromises their separation performance, i.e. poor molecular selectivity, physical aging and plasticization. In particular, for industrially and environmentally important gases, such as CO$_2$/CH$_4$ separation in natural gas industry, both of which have high solubility in glassy polymers, tailoring the distribution, size, and architecture of free volume elements is critical to achieve substantial increase of diffusivity selectivity via molecular sieving function. One approach for modification of PIMs has been through substitution with CO$_2$-philic tetrazole groups (TZ-PIMs) to enhance the solubility selectivity. An alternative strategy is enhancing the rigidity of polymer chains while maintaining interchain spacing, such as PIMs containing rigid ethanoanthracene (EA) and Tröger's Base (TB) units, and our approach of covalently oxidative crosslinking reported in this invention.

In the present invention, thermal oxidation and crosslinking is performed at the post-synthetic modification of polymer membranes at the microscopic level. The thermal oxidative crosslinking method is effective in tailoring the architecture of free volume elements in PIM polymers by heat treatment in the presence of trace amounts of oxygen molecules. The resulting covalently crosslinked polymer networks offer superior thermal stability, chemical stability, reasonable mechanical strength, enhanced rigidity. Most important of all, the thermal crosslinking effectively narrow the gates of interconnected free volume elements, mimicking the hour-glass-like microstructure of water and ion channels in natural biological membranes. The high free volume allows high sorption and rapid movement of gas molecules, while the narrow gates serve as an effective sieve that allows small gas molecules to pass through while blocking large molecules. Such unique structure significantly improves the molecular-sieving function that yields significantly enhanced selectivity and high gas permeability that surpassing the upper bound limiting the polymer membranes for decades. The thermal crosslinking method is also effective for crosslinking of nanocomposite membranes with porous or nonporous fillers.

Heat treatment of PIMs polymer is carried out under controlled temperature and oxygen concentration. Temperature ranges from about 300-500° C. preferably about 350 to 450° C. Starting material (PIM polymer) can be pretreated at a temperature of below about 300° C., preferably about 120-200° C. Heating rate is below 10° C./min (this is not a critical parameter); Cooling rate is 5-10° C./min, for example. Oxygen concentration ranges from about 0-100 vol %, preferably about 0 to about 500 ppm, more preferably about 20 to about 200 ppm, most preferably about 50-100 ppm. Atmosphere is preferably low vacuum (preferably below 1 mbar); or purging of gas containing low concentration of O$_2$ balance in inert gas (argon, nitrogen, helium, etc). Reaction time is preferably 1 to 24 hours, more preferably 2 to 12 hours.

The crosslinked polymer of the invention has the following properties:
(i) tensile strength: about 10 to about 100 MPa, preferably about 50-60 MPa,
(ii) elongation stain at break: about 1-10%, preferably about 4-8%,
(iii) Young's modulus: about 0.5 to about 2.5 GPa, preferably about 1.2 to about 1.7 GPa.

The crosslinked polymer of the invention is used in the form of membrane, sheet, powder or granule.

Fillers may be incorporated in the crosslinked polymer. In a composition, filler is preferably about 1-20 wt %, more preferably about 1-10 wt %, and the crosslinked polymer is preferably about 99-80 wt %, more preferably about 99-90 wt %. The filler include microporous zeolitic imidazolate frameworks (ZIF-8), nanocrystals, nonporous inorganic nanoparticles (fumed silica, primary size of about 3-50nm, eg. 12 nm), MOFs, porous organic cages (POCs), covalent organic frameworks (COFs).

[Materials to be Separated]

Owing to its excellent separation performance with respect to various gases and liquids, the crosslinked polymer of the present invention is useful as a sorption material for separation carbon dioxide, hydrogen, carbon monoxide, oxygen, nitrogen, organic vapour or organic substance, hydrocarbons having from 1 to 4 carbon atoms (such as methane, ethane, ethylene, or acetylene, propane, butane), noble gases (such as helium, neon, argon, krypton, or xenon), hydrogen sulfide, ammonia, sulfur oxides, nitrogen oxides, siloxanes (such as hexamethylcyclotrisiloxane or octamethylcyclotetrasiloxane), water vapor, and organic vapor. The term "organic vapor" means a vaporizing gas of an organic substance that is in liquid form at ordinary temperature under ordinary pressure. Examples of such an organic substance include alcohols such as methanol and ethanol, amines such as trimethylamine, aldehydes such as acetaldehyde, aliphatic hydrocarbons having from 5 to 16 carbon atoms, aromatic hydrocarbons such as benzene and toluene, ketones such as acetone and methyl ethyl ketone, and halogenated hydrocarbons such as methyl chloride and chloroform.

[Preferable Embodiments]

The inventors confirmed the critical role of oxygen in thermal oxidative crosslinking of the polymer membranes. A critical issue for the thermal transformation of PIM-1 polymer is that the chemical reactions significantly depend on the atmosphere and could be categorized into oxidative degradation, decomposition, and controlled oxidation. PIM-1 polymer is thermally stable in inert atmosphere, with evident decomposition occurring at temperature above 450° C. in pure argon (FIG. 3) In situ FTIR spectra of gaseous products evolved during pyrolysis in TGA indicates that the scission of ether linkages in the backbone is the major step of decomposition since only dioxane linkages are the oxygen-containing groups, followed by decarboxylation reaction generating, primarily, $CO_2$ as gaseous product (2260 $cm^{-1}$). At higher temperature, the resulting fragments undergo further chemical reactions including crosslinking, cyclization, and finally become graphite. In contrast, thermal oxidative degradation of polymer occur in higher $O_2$ concentration, with evident oxidation starting at 350° C. in air and generating $CO_2$ as major gaseous product. Such oxidative degradation is confirmed by baking the polymer membranes to high temperature in air at atmospheric pressure. Such thermal analyses results indicate that there is a reaction temperature window between 350-450° C., where the controlled oxidation is possible. The rate of thermal oxidation of PIM-1 polymer could be significantly slowed down in inert purging gas. For example, the polymer heated in argon containing 200 ppm $O_2$ at 450° C. underwent pyrolysis, rather than complete degradation in air. Exposing the membranes in gas with low $O_2$ concentration of 200 ppm in the temperature range of 300-450° C. for prolonged period could result different degree of degradation (FIG. 4). FTIR spectra of the polymer films after isothermal TG experiments correspond to the degree of degradation of the polymer. While the high degree of degradation may induce pyrolysis and carbonization which is not favoured for the application of membranes, these accelerated experiments confirm the mechanism of oxidative crosslinking in the presence of oxygen and the delicate control of degree of crosslinking. These experiments also demonstrate that we are able to control the extent of oxidation and crosslinking, and stop the reaction at the suitable point rather than significant degradation or carbonization. Thermal analyses also confirm that the oxidation reactions could occur through the film rather than surface oxidation, owing to the high permeability of oxygen in the matrix.

We fabricated self-standing dense PIM membranes (thickness 1 to 50 □m, preferably 3 to 40 □m, more preferably 5 to 30 □m) by a solution casting method, or thin films by spin coating. For dense PIM-1 membranes or thin films, after thermal treatment at 385° C. for 24 h under vacuum, the transparent membranes changed from fluorescent yellow to dark brown as visually observed (FIG. 5, table 1) while remaining transparent.

TABLE 1

Gel content of crosslinked PIM-1 membranes in common solvents.

| No | Solvents | Density | Gel content (wt %) |
|---|---|---|---|
| 1 | Chloroform | 1.498 | 0 |
| 2 | Chloroform | 1.498 | 94.1 |
| 3 | Tetrahydrofuran (THF) | 0.886 | 92.6 |
| 4 | Dichloromethane (DCM) | 1.3266 | 95.1 |
| 5 | Chlorobenzene | 1.1066 | 98.9 |
| 6 | 1,2 Dichlorobenzene | 1.306 | 99.4 |
| 7 | N-Methyl-2-pyrrolidone (NMP) | 1.030 | 96.9 |
| 8 | Dimethylformamide (DMF) | 0.944 | 97.6 |
| 9 | 1,4 Dioxane | 1.033 | 98.8 |
| 10 | Acetone | 0.786 | 99.0 |
| 11 | Dimethyl sulfoxide (DMSO) | 1.092 | 99.0 |
| 12 | Toluene | 0.867 | 100 |
| 13 | Hexane | 0.655 | 100 |
| 14 | Cyclohexane | 0.779 | 100 |
| 15 | Acetic acid | 1.049 | 100 |
| 16 | Isopropanol | 0.785 | 100 |
| 17 | ETOH | 0.789 | 100 |
| 18 | MeOH | 0.791 | 100 |
| 19 | HCl in water | ~1.0 | 100 |
| 20 | NaOH in water | ~1.0 | 100 |

The thermally crosslinked PIM-1 (termed as TXL-PIM-1 hereafter) polymer membranes became largely insoluble (gel content >95%) in solvents that readily dissolve the PIM-1 polymer, such as chloroform, tetrahydrofuran, or dichloromethane. The thermally treated membranes showed slight solubility in polar solvents releasing fragments. The evolution of molecular weight distribution of the soluble fraction indicates the oxidative chain scission occurred under these thermal treatment conditions, while the gel content increased simultaneously indicating that in situ covalent crosslinking occurred.

For those membranes cured at 385° C. for up to 24 h under vacuum, the weight as measured before and after heat treatment showed a loss up to 2-3 wt %. Compared to those delicately controlled experiments operated in TGA (FIG. 4), these values were interfered by the gas and moisture during measurement of sample in ambient condition. Yet, the extent of degradation and corresponding weight loss do agree well with the accelerated experiments in TGA. The skeletal density of crosslinked membranes slightly increased from 1.335±0.006 g $cm^{-3}$ to 1.365±0.007 g $cm^{-3}$ according to measurement by helium pycnometer. Also there is no substantial change in apparent bulk density (1.060-1.100 g $cm^{-3}$).

The inventors further tuned the degree of thermal crosslinking of PIM-1 polymer by controlling the chemical reaction kinetics, via changing the $O_2$ concentration, temperature, and reaction time. To summarize, these characterization analyses suggest a thermal degradation mechanism following pathways of free-radical induced oxidative chain scission, and in situ covalent crosslinking upon combination of adjacent radical sites via the decarboxylation reactions.

The thermally crosslinked polymer membranes in low concentration of oxygen, either under vacuum or purging gas, become stiff but are still mechanically flexible. A typical plot of stress-strain curve (FIG. 7) shows that TXL-PIM-1 polymer networks become stiff but are still mechanically robust in terms of tensile strength (50-60 MPa; table 2), elongation stain at break (in the range of 4-8%), and Young's modulus (1.2 to 1.7 Gpa; table 2). The TXL-PIM-1 membranes are far more flexible than carbon molecular sieve membranes. The carbon membranes prepared from PIM-1 polymer at temperature higher than 450° C. also became very brittle because the polymer backbone has been excessively broken. In contrast, for the thermally crosslinked PIM-1 polymer, we expect that thermal oxidative chain scission and crosslinking occur locally at the gates of micropores while the most part of the polymer chains maintained intact. For those nanocomposite membranes, the mechanical properties deteriorate with the loading of fillers increase. Nanoindentation measurements were performed on the surface of dense polymer membranes and confirmed that the Young's modulus maintained at 1.9 GPa while the hardness increased from 150 to 190 MPa, corresponding to the formation of crosslinked polymer network (table 3).

TABLE 2

Mechanical properties. The data were derived from stress-strain profiles of PIM-1, thermally crosslinked PIM-1 films, and some representative membranes in the literature.

| Samples | Tensile strength at break (MPa) | Elongation Strain at break (%) | Young's modulus (GPa) |
| --- | --- | --- | --- |
| PIM-1 | 47.5 ± 2.3 | 14.3 | 1.43 ± 0.15 |
| PIM-1 385° C. 1 mbar 8 h | 56.5 ± 2.8 | 7.1 | 1.28 ± 0.37 |
| PIM-1 385° C. 1 mbar 12 h | 60.0 ± 3.0 | 5.8 | 1.45 ± 0.05 |
| PIM-1 385° C. 1 mbar 24 h | 54.8 ± 2.7 | 4.4 | 1.72 ± 0.05 |
| PIM-1 385° C. 10 mbar 1 h | 36.4 ± 1.8 | 2.3 | 1.80 ± 0.02 |
| PIM-1 385° C. air 10 min | 14.0 ± 0.7 | 0.7 | 1.96 ± 0.03 |
| Crosslinked nanocomposite | | | |
| PIM-1/SiO$_2$ 1 wt % 385° C. 1 mbar 24 h | 38 | 2.4 | 1.90 |
| PIM-1/SiO$_2$ 2 wt % 385° C. 1 mbar 24 h | 35 | 2.3 | 1.60 |
| PIM-1/SiO$_2$ 5 wt % 385° C. 1 mbar 24 h | 21 | 1.4 | 1.55 |
| PIM-1/SiO$_2$ 10 wt % 385° C. 1 mbar 24 h | 15 | 1.0 | 1.50 |
| PIM-1/ZIF-8 5 wt % 385° C. 1 mbar 24 h | 23 | 1.6 | 1.51 |
| PIM-1/ZIF-8 10 wt % 385° C. 1 mbar 24 h | 19 | 1.4 | 1.39 |
| PIM-1/ZIF-8 20 wt % 385° C. 1 mbar 24 h | 16 | 1.3 | 1.33 |

TABLE 3

Young's modulus and Hardness derived from nanoindentation measurement.

| Sample | Young's modulus E (GPa) | Hardness H (MPa) |
| --- | --- | --- |
| PIM-1 120° C. 24 h | 1.876 ± 0.029 | 149 ± 4.0 |
| TXL-PIM-1 385° C. 24 h | 1.885 ± 0.039 | 188 ± 3.0 |
| PIM-1/ZIF-8 20 wt % 120° C. 24 h | 1.954 ± 0.075 | 159 ± 13.0 |
| TXL-PIM-1/ZIF-8 20 wt % 385° C. 24 h | 1.732 ± 0.027 | 158 ± 4.0 |

Cross-sectional SEM images (FIG. 8) show that TXL-PIM-1 films are dense without defects, and crosslinking is also effective for nanocomposite membranes, either with porous fillers (e.g. ZIF-8) or nonporous inorganic nanoparticles (e.g. silica). The poor interface observed in the unmodified nanocomposites could be improved after thermal treatment.

The crosslinking is also effective for thin films coated on different substrates, including glass or silicon wafer (FIG. 9). The thin films after crosslinking became insoluble in chloroform. These characterization analyses indicate that it is feasible to fabricate thermally crosslinked polymer thin films, for example, by coating the polymer on porous thermally stable inorganic membrane substrates forming thin film composite (TFC) membranes. The fabrication of TFC membranes, which we believe would become an engineering issue rather than the materials discovery, so was not covered in this invention.

Thermogravimetric analysis indicated that the TXL-PIM-1 remain stable up to ~450° C. in an inert argon atmosphere (FIG. 10). The heat flow curves show very weak peaks at about 500° C., which may be assumed as glass transition temperature. For the glassy PIM-1 polymer with rigid and contorted macromolecular structure consisting of aromatic rings, the glass transition temperature is not meaningful because the polymer decomposes to carbon at such high temperature rather than transit to liquid state. Instead, the initial degradation temperature became a critical parameter to evaluate the thermal stability. The amorphous nature and densely packing of the crosslinked polymers is reflected by the smaller interchain spacing observed in wide-angle X-ray scattering (FIG. 11). The FTIR spectra of thermally treated polymer films under low vacuum confirmed the presence of carbonyl groups and hydroxyl groups (FIG. 12), particularly for samples treated at intermediate temperature (300-350° C.), a clear evidence of oxidation.

The porosity or free volume elements in the crosslinked PIM-1 network were probed with various gas sorption measurements. Low temperature $N_2$ sorption/desorption at 77 K and $CO_2$ sorption at 273 K are widely used methods to probe the pore structure of microporous materials. For precipitated PIM-1 polymer powders or PIM-1 thin films, the sorption of nitrogen molecules was not limited by diffusion owing to the open porous microstructure. Therefore, high adsorption occurred at low pressure, as shown in FIG. 13. In contrast, the $N_2$ adsorption in thick polymer membranes or thermally crosslinked membranes at 77 K showed an unexpected gate-opening effect, which is related to the kinetic-limited diffusion of $N_2$ molecules through the dynamically open-and-shut gates connecting free volume elements or formation of inaccessible pores due to crosslinking. Crosslinked nanocomposite membranes also show similar kinetic-controlled sorption (FIG. 14). These adsorption isotherms indicate that the nitrogen molecules are probably too big to probe the structure of free volume elements and channels which are at molecular dimensions.

Gas sorption isotherms were also measured with $CO_2$, $CH_4$ and $N_2$ at 273 K and 295 K, as shown in FIG. 15 and FIG. 16. In particular, the sorption of $CO_2$ at 273 K has been widely used to probe the porosity in microporous materials. Here, the TXL-PIM-1 polymer showed slightly lower $CO_2$ sorption as compared to PIM-1. However, the hysteresis phenomenon observed during $CO_2$ desorption indicate that the $CO_2$ molecules may be also subject to kinetic-limited diffusion at lower temperature. High-pressure gas sorption isotherms of TXL-PIM-1 show comparable solubility of various gases to unmodified PIM-1 at room temperature (295 K), following the dual mode sorption mechanism without observable plasticization at high pressure (FIG. 17). Pore size distribution derived from the $CO_2$ sorption isotherms indicate the loss of porosity mainly occur in the size range smaller than 6 Å (in which gas probing becomes less reliable), which is in agreement with our hypothesis that thermal oxidative crosslinking occur at the gates and channels connecting free volume elements. Single-gas permeations through polymer membranes were performed at 22° C. with industrially-important gas molecules with different kinetic diameters, including $H_2$ (2.89 Å), $CO_2$ (3.3 Å), $O_2$ (3.46 Å), $N_2$ (3.64 Å), and $CH_4$ (3.8 Å). As shown in Table and FIG. 18, the gas permeability of unmodified PIM-1 follows the sequence of $CO_2>H_2>O_2>CH_4>N_2$, owing to the combined effects of preferable sorption (e.g condensable $CO_2$ and $CH_4$) and diffusion (gas molecules with smaller sizes) (table 4).

TABLE 4

Gas permeability, solubility, and diffusion coefficient for PIM-1 and a representative thermally crosslinked TXL-PIM-1 membranes (heated at 385° C. for 24 h under vacuum of 1 mbar).

| Parameters | Pure gas | | | | | Gas pairs | | | | |
|---|---|---|---|---|---|---|---|---|---|---|
| | $H_2$ | $CO_2$ | $O_2$ | $N_2$ | $CH_4$ | $CO_2/N_2$ | $CO_2/CH_4$ | $O_2/N_2$ | $H_2/CO_2$ | $H_2/CH_4$ |
| PIM-1 | | | | | | | | | | |
| P(Barrer) | 3408 | 5135 | 1135 | 356 | 397 | 14.4 | 12.9 | 3.2 | 0.7 | 8.6 |
| S [cm$^3$ (STP) cm$^{-3}$ bar$^{-1}$] [a] | 0.452 | 34.60 | 2.80 | 2.47 | 9.3 | 14.0 | 3.7 | 1.1 | 0.01 | 0.05 |
| D (10$^{-8}$ cm$^2$ s$^{-1}$) [b] | 4647 | 117 | 311 | 102 | 39 | 1.1 | 3.0 | 3.0 | 40 | 119 |
| TXL-PIM-1 | | | | | | | | | | |
| P(Barrer) | 1820 | 1100 | 245 | 30.1 | 15.9 | 37 | 69 | 8.1 | 1.7 | 115 |
| S [cm$^3$ (STP) cm$^{-3}$ bar$^{-1}$] [a] | 0.42 | 33.70 | 2.68 | 2.33 | 8.95 | 14.5 | 3.8 | 1.2 | 0.01 | 0.05 |
| D (10$^{-8}$ cm$^2$ s$^{-1}$) [b] | 3317 | 24.9 | 69.4 | 9.8 | 1.35 | 2.5 | 18.4 | 7.1 | 133 | 2457 |

[a] gas solubility measured at 1 bar at 22° C.
[b] calculated from D = P/S, as the gas permeability is quite constant at low permeation pressure.

After slow thermal crosslinking at 385° C., the membrane showed significantly lower gas permeability for large molecules ($N_2$ and $CH_4$) by two magnitudes, while small gas molecules ($H_2$, $CO_2$, $O_2$) maintained considerably high permeability, giving a more evident molecular sieving function. For TXL-PIM-1, the $O_2/N_2$ selectivity increased up to 8.1 with a high $O_2$ permeability of 250 Barrer [1 Barrer=1× $10^{-10}$ cm$^3$ cm cm$^{-2}$ s$^{-1}$ cmHg$^{-1}$ at standard temperature and pressure (STP)]. The $CO_2/CH_4$ selectivity is as high as 70 with a $CO_2$ permeability of 1100 Barrer. Gas transport in microporous PIM polymer can still be illustrated with the solution-diffusion model, where the permeability coefficient is a product of solubility (S) and diffusion coefficient (D), P=S×D. The solubility and diffusion coefficient were derived as shown in FIG. 19. The solubility of various gases in TXL-PIM were determined from sorption isotherms in FIG. 17, and was not significantly altered from the native PIM. The significant increase of gas pair selectivity is attributed to the increase in diffusivity selectivity ($D_A/D_B$) while the solubility selectivity ($S_A/S_B$) is quite constant, in agreement with the expected structural modification of the gateways between the interconnected free volume elements.

From the viewpoint of chemical reaction engineering, we could tailor the degree of crosslinking and gas transport properties via controlling temperature, reaction time, and $O_2$ concentration in purging gas or vacuum pressure, consequently we are able to tune the gas transport properties. The evolution of gas transport properties as a function of the thermal crosslinking reaction time is shown in FIG. 20

To demonstrate the critical effect of oxygen in tuning the structure of free volume elements, we varied the atmosphere of the vacuum oven to different vacuum or purging gas with varied concentration of oxygen (FIG. 21). In extreme cases, the inventors baked the polymer at 385° C. in air. The selectivity was enhanced up to 70, while the $CO_2$ permeability maintained as high as ~500 Barrer, though the membrane became brittle due to the extensive oxidative chain scission.

A representative plot of selectivity versus permeability is shown in FIG. 22 for an industrially important $CO_2/CH_4$ gas pair along with the upper bound limit of polymer membranes. For a representative TXL-PIM-1 membrane cured at 385° C. for 24 h under vacuum, the $CO_2/CH_4$ selectivity increased up to 70 with a high $CO_2$ permeability of 1100 Barrer. The separation performance of other industrially important gas pairs, such as $O_2/N_2$, $CO_2/N_2$, $H_2/N_2$, and $H_2/CH_4$, are all above their respective upper bounds, as shown in FIG. 23. For example, the $O_2/N_2$ selectivity could be as high as ~8.0 with a high $O_2$ permeability of 250 Barrer, which is very promising for air separation. The notable $H_2$ separation over $N_2$ and $CH_4$ are attractive for practical applications in $H_2$ recovery and natural gas purification. The significantly enhanced gas selectivity along with high permeability improves the overall gas transport properties, surpassing the upper bound that has been limiting the performance of polymer membranes for decades. To the best of our knowledge, the overall separation performance is better than all the existing soluble PIMs polymers, and comparable or superior to TR polymers.

TABLE 5

Gas transport properties of thermally crosslinked PIM (TXL-PIM) membranes.

| Sample | Permeability (Barrer) | | | | | Selectivity | | | | |
|---|---|---|---|---|---|---|---|---|---|---|
| | $H_2$ | $CO_2$ | $O_2$ | $N_2$ | $CH_4$ | $CO_2/N_2$ | $CO_2/CH_4$ | $O_2/N_2$ | $H_2/N_2$ | $H_2/CH_4$ |
| PIM-1 | 3408 | 5135 | 1135 | 356 | 397 | 14.4 | 12.9 | 3.2 | 9.6 | 8.6 |
| TXL-PIM-1 385° C. 1 h | 2979 | 5101 | 1013 | 281 | 301 | 18.1 | 16.9 | 3.6 | 10.6 | 9.9 |
| TXL-PIM-1 385° C. 2 h | 2945 | 4532 | 943 | 213 | 243 | 21.3 | 18.6 | 4.4 | 14 | 12 |
| TXL-PIM-1 385° C. 4 h | 2525 | 3876 | 815 | 165 | 169 | 23.6 | 22.9 | 4.9 | 15 | 15 |
| TXL-PIM-1 385° C. 8 h | 2328 | 1956 | 445 | 72 | 58 | 27.1 | 34.0 | 6.2 | 32 | 40 |
| TXL-PIM-1 385° C. 12 h | 2204 | 1680 | 395 | 56 | 30 | 29.9 | 56.5 | 7.0 | 39 | 74 |
| TXL-PIM-1 385° C. 24 h | 1820 | 1100 | 245 | 30 | 16 | 36.6 | 69.2 | 8.1 | 60 | 114 |

We also demonstrate the excellent selectivity of the thermally crosslinked polymer membranes in separation of gas mixtures, such as $CO_2/CH_4$ (up to 60) and $CO_2/N_2$ (up to 40) (FIG. 24). In a mixed gas atmosphere, both $CO_2$ and $CH_4$ molecules compete for sorption sites, particularly at high pressure. Therefore, we observed a decrease in the $CO_2/CH_4$ selectivity at high pressure, which nevertheless is still as high as 30 over $CO_2$ fugacity of 5-10 bar, a range of interest for industrial natural gas purification.

The inventors further fabricated nanocomposite membranes by dispersing nanoparticles in polymer matrices. For the nanocomposite membranes containing ZIF-8, XRD analyses confirmed the high crystallinity of ZIF-8 after annealing at moderate temperatures (<200° C.). However, mesoporous cavities could always be observed in the polymer phase or around the nanoparticles by high magnification SEM (FIG. 8). Such poor interface is attributed to the phase separation between the polymer phase and fillers. In fact, the incorporation of nanoparticles into polymer matrix disrupts the packing of polymer chains, according to previous findings by Freeman and co-workers [NPL 33, Merkel et al, Science, 2002]. Compared to dense PIM-1 membranes, the nanocomposite membranes annealed at moderate temperatures (120° C.) showed enhanced $N_2$ sorption at low pressure stage, and slightly higher than that of PIM-1 thin films (~300 nm), while the gate-opening behaviour was not observed in these nanocomposite films, because the gas sorption was not limited by kinetic control of diffusion owing to the disrupted packing of polymers behaving as thin films. In contrast, gas sorption isotherms of those crosslinked membranes showed gate-opening type sorption.

The gas transport properties of nanocomposite membranes were significantly dependent on the degree of oxidation and crosslinking. At intermediate temperature (300-350° C.), thermal oxidation of membranes (with negligible covalent crosslinking as indicated by gel fractions) could also result in selective membranes. Characterization analyses (FIGS. 12) indicate the possible intermolecular interactions between oxidized polymer chains, or hydrogen bonding between ZIF-8 (e.g. imidazole group at surface of crystals) and surrounding polymer chains, which tightens the interface. Covalently crosslinked polymer nanocomposite membranes (>350° C.) enhance the permeability and maintain reasonable selectivity. We proved that similar behaviour was observed using nonporous nanoparticles (e.g. nanosized silica and $TiO_2$) as fillers. The enhancement of gas permeability of nanocomposite membranes containing silica and ZIF-8 could be correlated with the volume fraction of fillers, as shown in FIG. 25. We also derived the gas solubility and diffusion coefficient of these nanocomposite membranes (FIG. 25). The gas solubility of these nanocomposites is close to that of pure polymers, so the increase of permeability is attributed to the increase in diffusion coefficients. The enhancement of diffusion is likely to be affected by the Knudsen diffusion induced by the inefficient packing of polymer chains and defects at the polymer/filler interfaces. Nanofillers disrupt the packing of polymer chains and physically change the microstructure and free volume elements of polymer phase, as demonstrated previously by Freeman and co-workers. These additional free volume elements and heterogeneous microstructure resulted in more complicated interface when the membranes were exposed to reaction and cros slinking. However, as demonstrated in this invention, the thermally crosslinked PIMs could be used as a host of nanofillers for fabrication of crosslinked nanocomposite materials that would offer excellent gas separation performance that surpass the upper bound (FIG. 26) and all of the PIMs materials in the literature or any prior art. These nanocomposite materials would also be useful for many other molecular separations.

A particular concern for the use of glassy polymeric materials as gas separation membranes is their performance over several years, where the glass is expected to age. The gas permeability of PIM shows gradual loss whilst the selectivity shows a slight increase as the system tends to reach equilibrium, but at rates lower than other high free volume polymers, such as poly(1-trimethylsilyl-1-propyne) (PTMSP). The aging of thermally crosslinked PIM-1 membranes followed a decrease in permeability and increase in selectivity under vacuum-mode over initial 3-5 days, but then slowly stabilized over a subsequent month. The physically aged membranes still offer remarkable gas separation performance.

The novelty of our invention is the transformation of microporous polymer precursors to covalently crosslinked polymer networks exhibiting remarkable gas separation performance that are superior to many of the polymer systems mentioned above, for a number of gas-pairs and comparable to that of CMS membranes, but with superior mechanical flexibility and ease of processability. The concept of crosslinking in microporous polymers is considered by other works, though less effectively than is observed here. In this invention, the enhancement in selectivity and reduction in overall permeability is governed by the thermo-oxidative alteration of the gateways between high-free-volume domains. Gel-studies indicate the formation of covalently crosslinked network and sorption data shows little change in the overall solubility of gases, before and after thermal processing. The latter indicates that mild oxidative chemical change has taken place primarily at these gateways with minimal impact on the overall fractional free volume.

In summary we have demonstrated that the gas separation performance of PIMs polymer membranes can be significantly improved by carefully tuning the gate-ways that connect the micropores via mild chemical changes by controlled thermal processing. Our invention represents an example of tuning the structure of molecular sieves from disordered organic frameworks with a broad distribution of size and topologies of free volume elements or micropores. Our approach leads to highly permeable and selective membranes that show great potential for large-scale gas separations in global energy and environmental processes, such as capturing $CO_2$ from flue gas, air separation, biogas and natural gas production, $H_2$ production, and separation of hydrocarbons (olefin/paraffin) in petrochemical industries. Furthermore, this broader principle is instructive in utilizing other similarly nanostructured polymeric materials for a wide range of applications.

EXAMPLES

The present invention is described in further detail with reference to Examples and Comparative Examples. However, the scope of the invention is not limited to these Examples.

Materials and Methods

Synthesis of PIM-1

The PIM-1 polymer was synthesized following the method invented by Budd and McKeown. A one-step polycondensation via a double aromatic nucleophilic substitution from purified monomers, 5,5',6,6'-tetrahydroxy-3,3,3',3'-tetramethylspirobisindane (TTSBI, 30 mmol) and 2,3,5,6-tetrafluoroterephthalonitrile (TFTPN, 30 mmol), was performed in the presence of $K_2CO_3$ (60 mmol) in anhydrous dimethylformamide (200 mL) at 60° C. for about 48 h. The polymer was purified by dissolving in chloroform and re-precipitation from methanol, filtered and dried in vacuum oven at 110° C. for overnight. The molecular weight was determined from gel permeation chromatography (GPC).

Preparation of Polymer Membrane

The polymer was dissolved in a solution of chloroform (1-2 wt %) and nondissolved particles were removed by filtration through PTFE filters (0.45 or 1.0 um) or by centrifugation at 12,000 rpm for 30 min. For preparation of pure polymer membranes, the concentration of polymer solution was further adjusted to 8-10% by bubbling pure $N_2$ to slowly evaporate excess solvent. Polymer solutions were casted on clean glass substrate in a glove box. After the solvent has been slowly evaporated at room temperature in two days, the dry free-standing membrane was removed from glass substrate, and exposed to methanol soaking for overnight and dried in air. After, the membrane was dried in a vacuum oven at 120° C. prior to further thermal treatment at higher temperature. Nanocomposite membranes were prepared from the colloidal solution of polymer/nanoparticle mixture and followed the same protocol of solution casting and post treatment.

Preparation of Polymer Nanocomposite Membrane.

Two types of nanoparticles were used as fillers: (1) porous zeolitic imidazolate framework (ZIF-8) nanocrystals, (2) nonporous inorganic nanoparticles ($SiO_2$, $TiO_2$, etc).

The ZIF-8 nanocrystals with diameter of 60-100 nm were synthesized by rapid reaction of zinc nitrate hexahydrate [$Zn(NO_3)_2 \cdot 6H_2O$] and 2-methylimidazole [$C_4H_6N_2$] in methanol. The ZIF-8 nanocrystals dispersed in chloroform were then mixed with PIM-1 polymer solution and stirred in a glass vial for two days. After, the mixture was bubbled with pure $N_2$ to slowly evaporate excess solvent until suitable polymer concentration was reached (8-10%). After, the solution of PIM-1/ZIF-8 colloidal mixture was casted to form nanocomposite membranes, following the same procedure as that of pure polymer.

The fumed silica nanoparticles have an average primary particle size of 12 nm (99.8% trace metals basis, Sigma Aldrich) with specific surface area of 175-225 $m^2/g$ as claimed by the company. The size of primary particles were confirmed by SEM and STEM, however, aggregation of 200-300 nm was always observed even though we tried to disperse them (e.g. ultrasonic shear mixing). Such aggregated nanoparticles were dispersed in a solution of chloroform and mixed with diluted PIM-1 polymer solution and the resulting mixture thoroughly stirred for two days. Extra solvent was removed by evaporation to reach suitable concentration (8-10 wt %) for solution casting. The volume fraction $\phi_D$ of the dispersed phase in the mixed matrix membrane is defined as $$\phi_D = \frac{m_D/\rho_D}{m_D/\rho_D + m_C/\rho_C} \quad (1)$$

where m and ρ refer to the mass and density of the continuous phase (polymer) and dispersed phase (filler), respectively.

Preparation of Polymer Thin Film

Thin films were prepared by spin coating of diluted PIM-1 solution in chloroform (0.8-2 wt %) on clean silicon wafer or glass substrate. The thickness of films was tuned by varying the concentration of polymer solution and spinning speed.

Thermal Treatment of Membranes

The membranes were exposed to thermal treatment in a high-temperature vacuum oven (Hereasus, 20-400° C.) with controlled atmosphere. The vacuum oven was modified allowing operation in vacuum or purging mode. The pressure was monitored continuously by vacuum pressure transmitters. It should be noted that this high temperature vacuum oven does not give ultra-high vacuum, surprisingly, the presence of trance amount of oxygen in the oven leads to unexpected thermal oxidative crosslinking of polymers. Under high temperature annealing, the polymer films experience complicated physical and chemical changes owing to heat transfer (conduction and convection), mass transfer (diffusion of oxygen and products in polymer matrix), and reactions (oxidative chain scission and crosslinking, and also probably decomposition). In order to have better understandings of the mechanism of thermal treatment of these microporous polymer membranes, we changed the protocols of thermal treatment using a reaction engineering approach by varying the parameters such as reaction temperature, atmosphere (concentration of oxygen), and reaction time.

A series of experiments were performed by heating the polymer at different temperature under continuous vacuum (1 mbar). Flat polymer films were placed on the plate in the vacuum oven and heated under vacuum at 120° C. for 3 h, then heated to final temperature at 10° C./min. Then the samples were maintained at the temperature for extended time up to 24 h. In order to achieve suitable degree of crosslinking while maintaining reasonable mechanical strength, slow thermal oxidation for prolonged exposure time at low concentration of oxygen is necessary, which is operable compared to more delicate treatment of inorganic molecular sieves (zeolites, etc).

Another series of experiments were carried out by heating PIM-1 membranes in the vacuum oven at 385° C., with the vacuum pressure controlled at 1, 10, 20, 50, 100, 200 mbar, to confirm the critical role of oxygen in thermal oxidative crosslinking of the polymer.

In extreme cases, the polymer films were baked in air. In one series of experiment, the polymer films were heated from 120° C. to 385° C. at 10° C./min. Rapid change of colour from fluorescent yellow to brownish was observed when the temperature was above 350° C. During this heating stage, the polymer films were turned over frequently, manually with a tweezers. When the temperature reached to 385° C., the thermally oxidized brown polymer films were removed from the oven to avoid excessive degree of degradation (too brittle for gas permeation tests), and cooled down naturally to ambient temperature. Alternatively, the oven was switched to vacuum mode. In the mean time, the power of the oven was turned off allowing the films to cool down to room temperature under vacuum. In another series of isothermal experiment, fresh membranes were moved from ambient condition to the preheated oven (385° C.) and baked for 10 min, and removed from the oven immediately. The two methods gave similar degree of degradation of polymer, with weight loss at ~2.5 wt %. Caution should be taken to avoid over degradation due to the fast reaction rate (as evidenced by colour changing to black, indicating partial pyrolysis as proved by FTIR spectra).

Alternatively, we controlled the atmosphere of heat treatment by purging different gases, including high purity argon ($O_2$<10 ppb), and $O_2$ balanced with argon, with nominal $O_2$ concentration at 10(9.2), 50(55), 100(104), 200(215) ppm, where the value in parentheses are the calibrated concentration. The flow rate was controlled by a metering valve and confirmed by a soap bubble flow meter. The polymer films were placed on the heating plate in the oven, and exposed to vacuum at 120° C. under vacuum for 1 h, then purging gas was introduced to the oven to pressurize the oven close to 1000 mbar, then vacuum was switched on again to reduce the pressure to 1 mbar. After at least five cycles of vacuum-pressurization, the samples were exposed to continuous flow of purging gas.

Characterization

Thermal analyses of polymer films were also performed in a thermogravimetric analyser (TGA) Q500 and Q600 (simultaneous TGA-DSC) to study the thermal stability and simulate the thermal oxidative crosslinking reaction with well-controlled atmosphere. The gas species evolved from the TGA was analyzed by a FTIR. The gas atmosphere includes Argon, Air (zero grade), and $O_2$/Argon mixture (200 ppm $O_2$, balance argon).

In one series of experiments, polymer films were dynamically heated from room temperature to 1000° C. at 10° C./min in inert atmosphere or in air.

Another series of experiments were carried out using $O_2$/Argon mixture (200 ppm $O_2$, balance argon) to simulate slow thermal degradation. A batch of dense polymer films (~5 mg, dimension of 3×3 mm) were heated at 120° C. for 1 h under continuous flow of purging gas to remove moisture or residual solvents, then heated at 10° C./min to set-point temperature (300-450° C.), then kept at the set-point temperature for 2 h. The films recovered from the TGA were further analyzed with FTIR-ATR to confirm the presence and intensity of oxidized groups (particularly the carbonyl and hydroxyl groups). Scanning electron microscopy (SEM) was performed using a Hitachi S5500 microscope. The polymer films were fractured in liquid nitrogen and coated with a thin layer of gold. The molecular weight of polymer was quantified by gel permeation chromatography (GPC) calibrated with polystyrene standards. Diluted polymer solution in chloroform was tested. FTIR spectra were measured with a NICOLET spectrometer (iS10, Thermo Scientific) in transmission mode, or using the Bruker Tensor 27 Infrared Spectrometer, equipped with an attenuated total reflectance (ATR) cell. The skeletal density of polymer films were measured using a Micromeritics Accupyc 1340 helium pycnometer, equipped with a 1 cm³ insert. Typically, sample masses of 100-200 mg were used and the values quoted are the mean and standard deviation from a cycle of 15 measurements. Before density measurements, all samples were degassed thoroughly under vacuum at 150° C. for 5 hours. The apparent bulk density was measured from the gravimetric method, using films with uniform thickness, and quantifying the mass and size. Wide angle X-ray diffraction (XRD) was performed with a Bruker D8 machine operated at 40 mA and 40 kV using Cu Kα radiation with a step of 0.02° per second. The membrane sample was attached to a sample holder with a single crystal silicon substrate.

The crosslinked polymer films were heated at 120° C. under vacuum for overnight to remove the moisture and with the mass measured immediately. Then the films were soaked in volatile solvent chloroform for two days, with the insoluble film or gel removed from the solution by filtration or by centrifugation, washed with methanol and dried at 120° C. under vacuum. After, the mass was recorded again to quantify the content of crosslinked part. The solution containing dissolved polymer was used for GPC measurements to quantify the evolution of molecular weight distribution.

The solubility of crosslinked polymer films were also examined using other common solvents, or acid and alkaline solutions.

Tensile tests of polymer films were carried out at a home-made stretcher machine. Polymer films with thickness in the range of 50-80 um were cut into thin slices with an effective length of ~20 mm and a width of ~2 mm, with the accurate value determined from high-resolution photos and calibrations from known length. The films were stretched for 0.02 mm in each step with a relaxation time of 30 s, giving an apparent strain rate of $\sim 4\times 10^{-5}$ $s^{-1}$. The average value of Young's modulus was derived from the initial slope. The tensile strength at break and elongation at break were measured and compared. Nanoindentation of surfaces of polymer membranes were performed at ambient temperature using a sharp Berkovich tip in the continuous stiffness measurement (CSM) mode on an MTS NanoIndenter™ XP (MTS Corp., Eden Prairie, Minn.). The indenter axes were aligned normal to the membrane planes. The average values of the Young's modulus (E) and the hardness (H) were extracted from the force-displacement P-h curves over depths of 100-1000 nm, with a series of 20 measurements at different locations.

Gas Sorption Measurements

Low Pressure Gas Sorption

Low pressure gas sorption was performed using a Micromeritics ASAP 2020 instrument with pressure up to 1 bar. Dense polymer membranes (~0.1 g) with thickness of ~50 μm were cut into small pieces, loaded into the apparatus and degassed at 120° C. under high vacuum (<$10^{-6}$ bar). After the mass being measured, the samples were further degassed under high vacuum for 4 h prior to the gas sorption measurement. Nitrogen adsorption-desorption isotherms were measured at 77 K and 273 K, respectively. The sorption isotherms of $CO_2$ and $CR_4$ were also measured at 273 K. The specific surface area was calculated based on the Brunauer-Emmett-Teller (BET) model and the pore size distribution was derived from non-local density functional theory (NLDFT) model from $N_2$ isotherms at 77 K, or from $CO_2$ sorption isotherms at 273 K when the sorption of $N_2$ was subjected to kinetic control.

High-pressure Gas Sorption

The high-pressure pure-gas sorption properties were measured using a home-made dual-volume pressure-decay apparatus at pressure up to 35 bar and isothermal room temperature of 22° C. The pressures of sample chamber and gas charging chamber were measured continuously by two pressure transducers (Keller PAA33X, 0-35 bar) connected to a data acquisition system. A batch of polymer films was heated at 120° C. under high vacuum for 12 h. After measurement of the mass, the films were loaded in the sample cell and further evacuated for 12 h prior to sorption measurements. A certain amount of gas was then introduced into the sample chamber; the gas sorption in the polymer resulted in the decrease of pressure in the sample chamber and finally reached to equilibrium. The amount of gas sorption was calculated from the mass balance of gas molecules based on the equation of gas states, using the equilibrium pressure calibrated with compressibility factors. The measurements followed the sequence of $H_2$, $O_2$, $N_2$, $CH_4$, and $CO_2$. The samples were thoroughly evacuated between measurements of each gas.

The solubility coefficient (S) is described by a dual mode model:

$$S = \frac{C}{p} = k_D + \frac{C'_H b}{1+bp} \qquad (3)$$

Where C is the concentration, p is the pressure, $k_D$ is the Henry's law constant, $C'_H$ is the Langmuir capacity constant, and b is the Langmuir affinity constant.

Gas Permeation Measurements

Single Gas Permeation

Pure gas permeation tests were carried out at temperature of 22° C. and feed pressure of 4 bar, using a constant-volume pressure-increase apparatus. A piece of membrane was loaded in the apparatus and evacuated with a vacuum pump (Edwards RV3) prior to gas permeation measurements. The leak rate is negligible with good sealing and evacuation. The gas permeate pressure were continuously recorded by pressure transmitters connected to a data acquisition system. When the gas permeation reached to pseudo-steady state, the slope of pressure increase (dp/dt) in the permeate chamber became constant.

The gas permeability (P) is calculated based on the following equation:

$$P = \frac{Vl}{A} \frac{T_0}{p_f p_0 T} \left(\frac{dp}{dt}\right) \quad (4)$$

where P is the permeability of the gas through the membrane, expressed in Barrer (1 Barrer=$10^{-10}$ cm$^3$(STP) cm·cm$^{-2}$·s$^{-1}$·cmHg$^{-1}$), V is the permeate volume (cm$^3$), l is the thickness of membrane (cm), A is the effective area of the membrane (cm$^2$), $p_f$ is the feed pressure (cmHg), $p_0$ is the pressure at standard state (76 cmHg), T is the absolute operating temperature (K), $T_0$ is the temperature at standard state (273.15 K), (dp/dt) is the slope of pressure increase in the permeate volume at pseudo-steady state (cmHg s$^{-1}$). The error of the calculated permeability mainly originated from the variation of membrane thickness; for this study, the uncertainties of gas permeability at the moment of test are within ±5%, and selectivity within ±7%.

The diffusion coefficient (D) for a specific gas can be derived from the thickness of the membrane and the time lag (θ):

$$D = \frac{l^2}{6\theta} \quad (5)$$

Then the solubility (S) can be derived from:

$$S = \frac{P}{D} \quad (6)$$

Alternatively, the solubility is derived from the gas sorption measurements at 1 bar, and the diffusion co-efficient (at 1 bar) is calculated from the permeability (D=P/S), because the gas permeability is constant over the low pressure range. This was later verified by gas permeation at 1 bar.

The ideal selectivity ($\alpha_{A/B}$) of gas pairs, A and B, is defined as:

$$\alpha_{A/B} = \frac{P_A}{P_B} = \left[\frac{D_A}{D_B}\right]\left[\frac{S_A}{S_B}\right] \quad (7)$$

where $D_A/D_B$ is the diffusivity selectivity and $S_A/S_B$ is the solubility selectivity.

6.2 Mixed Gas Permeation

The mixed gas permeation properties were measured in another membrane cell using the constant-pressure variable-volume method. The membrane was exposed to certified gas mixtures of $CO_2/CH_4$ (50/50 vol. %) and $CO_2/N_2$ (50/50 vol. %) with feed pressure up to 35 bar at room temperature (22° C.), with a stage cut (ratio of flow rates of permeate to feed) less than 1%. The compositions of feed and permeate gas mixtures were measured by a gas chromatograph (Shimadzu, model 2014) equipped with a thermal conductivity detector (TCD) and a flame ionization detector (FID) calibrated by certified gas mixtures (Scientific and Technical Gases LTD, UK).

The invention claimed is:

1. A process for thermal crosslinking of polymers of intrinsic microporosity (PIMs) by heat treatment of PIMs at a temperature of 350 to 450° C. under a controlled oxygen concentration of 10 to 200 ppm.

2. The process according to claim 1, followed by heat treatment in inert atmosphere or high vacuum.

3. A crosslinked polymer of intrinsic microporosity (PIM) produced by the process according to claim 1.

4. A molecular sieve composition comprising the crosslinked polymer according to claim 3 and a porous or nonporous filler.

5. The composition according to claim 4, wherein said filler is selected from the group consisting of metal-organic frameworks (MOFs), zeolitic imidazolate frameworks (ZIFs), inorganic molecular sieves (zeolites), coordination organic polymers (COFs) and porous organic cages (POCs).

6. The composition according to claim 4 for use as materials for membrane-based gas separation, hydrocarbons and vapour separation, materials for adsorbents, materials for catalysts supports, materials for ionic conductive matrix, or materials for sensors.

7. The composition according to claim 4, wherein said filler is selected from the group consisting of nanoparticles made of silica and titanium oxide and other inorganic materials.

8. A material separation membrane comprising the crosslinked polymer according to claim 3 and a porous or nonporous filler.

9. A material separation membrane comprising the polymer according to claim 3 and a porous or nonporous filler, wherein the membrane is for use in nitrogen separation from air, oxygen enrichment from air, hydrogen separation from nitrogen and methane, carbon dioxide separation from natural gas, natural gas separation, olefin/paraffin separation, or carbon dioxide separation from flue gas.

10. The material separation membrane according to claim 8, wherein the membrane is for separating carbon dioxide, hydrogen, carbon monoxide, oxygen, nitrogen, hydrocarbons having 1 to 4 carbon atoms, noble gases, hydrogen sulfide, ammonia, sulfur oxides, nitrogen oxides, siloxanes, water vapor, or organic vapor.

11. The process according to claim 1, wherein the polymers of intrinsic microporosity (PIMs) is PIM-1.

* * * * *